US012038729B2

(12) United States Patent
Ratakonda et al.

(10) Patent No.: US 12,038,729 B2
(45) Date of Patent: Jul. 16, 2024

(54) INTUITIVE TERMINAL ASSIGNMENT AND WIRING DIAGRAM FOR A BUILDING MANAGEMENT SYSTEM

(71) Applicant: HONEYWELL INTERNATIONAL INC., Charlotte, NC (US)

(72) Inventors: Shreya Ratakonda, Charlotte, NC (US); Nagasree Poluri, Charlotte, NC (US); Foong Yeen Chan, Charlotte, NC (US); Abhijit Shirsath, Charlotte, NC (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 380 days.

(21) Appl. No.: 17/304,270

(22) Filed: Jun. 17, 2021

(65) Prior Publication Data
US 2021/0397149 A1 Dec. 23, 2021

(30) Foreign Application Priority Data

Jun. 22, 2020 (IN) .............................. 202011026345

(51) Int. Cl.
*G05B 19/042* (2006.01)
*G06F 30/13* (2020.01)
(Continued)

(52) U.S. Cl.
CPC .......... *G05B 19/042* (2013.01); *G06F 30/13* (2020.01); *G06Q 10/06315* (2013.01);
(Continued)

(58) Field of Classification Search
CPC ........ G05B 19/042; G05B 2219/25011; G05B 19/0426; G05B 2219/25428; G06F 30/13;
(Continued)

(56) References Cited

U.S. PATENT DOCUMENTS 6,041,178 A  3/2000 Rybarczyk et al.
9,273,878 B2 3/2016 Kucera
(Continued)

FOREIGN PATENT DOCUMENTS

CA      2879090 C     1/2014

OTHER PUBLICATIONS

IN Office Action Mailed Jan. 31, 2023 for Application No. 202011026345.
(Continued)

*Primary Examiner* — Charles R Kasenge
(74) *Attorney, Agent, or Firm* — Seager, Tufte & Wickhem, LLP

(57) ABSTRACT

A building management system, such as a small or medium business, having one or more control devices. Assigning codes to devices, and reading and listing them may aid in configuring the devices. Templates may be used for dynamic configuration of devices and equipment. Representing terminal assignments and wiring diagrams of control devices may be intuitive in that they resemble real hardware for ease of complete installation. The present system and approach may provide an intuitive way of securely registering devices with cloud usage, for example, involving a mobile phone with no manual entry of data so that a user can complete this process with ease. An intuitive, automatic and asynchronous device configuration downloading may be seen, such as to multiple control devices in a single shot. There may be seamless configuration data synchronization, for example, in view of replacement devices, or so the latest data is readily available.

17 Claims, 15 Drawing Sheets

(51) Int. Cl.
  *G06Q 10/06* (2023.01)
  *G06Q 10/0631* (2023.01)
  *G06Q 50/16* (2024.01)
  *G06Q 50/163* (2024.01)
  *H04W 4/30* (2018.01)
  *G06K 7/14* (2006.01)
  *G06K 19/06* (2006.01)
  *G06Q 10/087* (2023.01)
  *G06Q 10/10* (2023.01)
  *G06Q 10/20* (2023.01)

(52) U.S. Cl.
  CPC ............ *G06Q 50/163* (2013.01); *H04W 4/30* (2018.02); *G05B 2219/25011* (2013.01); *G06K 7/1417* (2013.01); *G06K 19/06037* (2013.01); *G06Q 10/087* (2013.01); *G06Q 10/103* (2013.01); *G06Q 10/20* (2013.01)

(58) Field of Classification Search
  CPC .. G06F 2111/02; G06F 2113/16; G06F 30/18; G06Q 10/06315; G06Q 50/163; G06Q 10/087; G06Q 10/103; G06Q 10/20; H04W 4/30; G06K 7/1417; G06K 19/06037
  See application file for complete search history.

(56) References Cited

U.S. PATENT DOCUMENTS

| | | |
|---|---|---|
| 10,031,494 B2 | 7/2018 | Holaso |
| 10,317,858 B2 | 6/2019 | Ray et al. |
| 10,409,243 B2 | 9/2019 | Holaso |
| 2007/0157639 A1* | 7/2007 | Harrod ..................... F24F 11/30 62/129 |
| 2009/0030534 A1* | 1/2009 | Dold ..................... G05B 19/056 700/86 |
| 2010/0076605 A1* | 3/2010 | Harrod ..................... F24F 11/56 700/276 |
| 2014/0188564 A1* | 7/2014 | Ghatti ................ G06Q 30/0204 705/7.33 |
| 2014/0279608 A1 | 9/2014 | Horst et al. |
| 2015/0144705 A1* | 5/2015 | Thiruvengada .... G05B 19/0423 236/94 |
| 2016/0025366 A1* | 1/2016 | Snow ..................... G05B 15/02 700/276 |
| 2017/0212482 A1 | 7/2017 | Boettcher et al. |
| 2018/0293504 A1 | 10/2018 | Meruva et al. |
| 2018/0299840 A1 | 10/2018 | Sinha et al. |
| 2020/0003448 A1 | 1/2020 | Schwegler et al. |
| 2020/0057827 A1 | 2/2020 | Eckenrode et al. |
| 2020/0349661 A1 | 11/2020 | Dutta et al. |
| 2021/0216938 A1 | 7/2021 | Chakraborty et al. |

OTHER PUBLICATIONS

U.S. Appl. No. 16/747,479, "Smart Building Score System," filed Jan. 20, 2020.
U.S. Appl. No. 17/304,209, "Configuration of Devices for Business Management Systems," filed Jun. 16, 2021.
U.S. Appl. No. 17/304,268, "A System for Dynamic Configuration of Devices/Equipment Using Templates," filed Jun. 17, 2021.

* cited by examiner

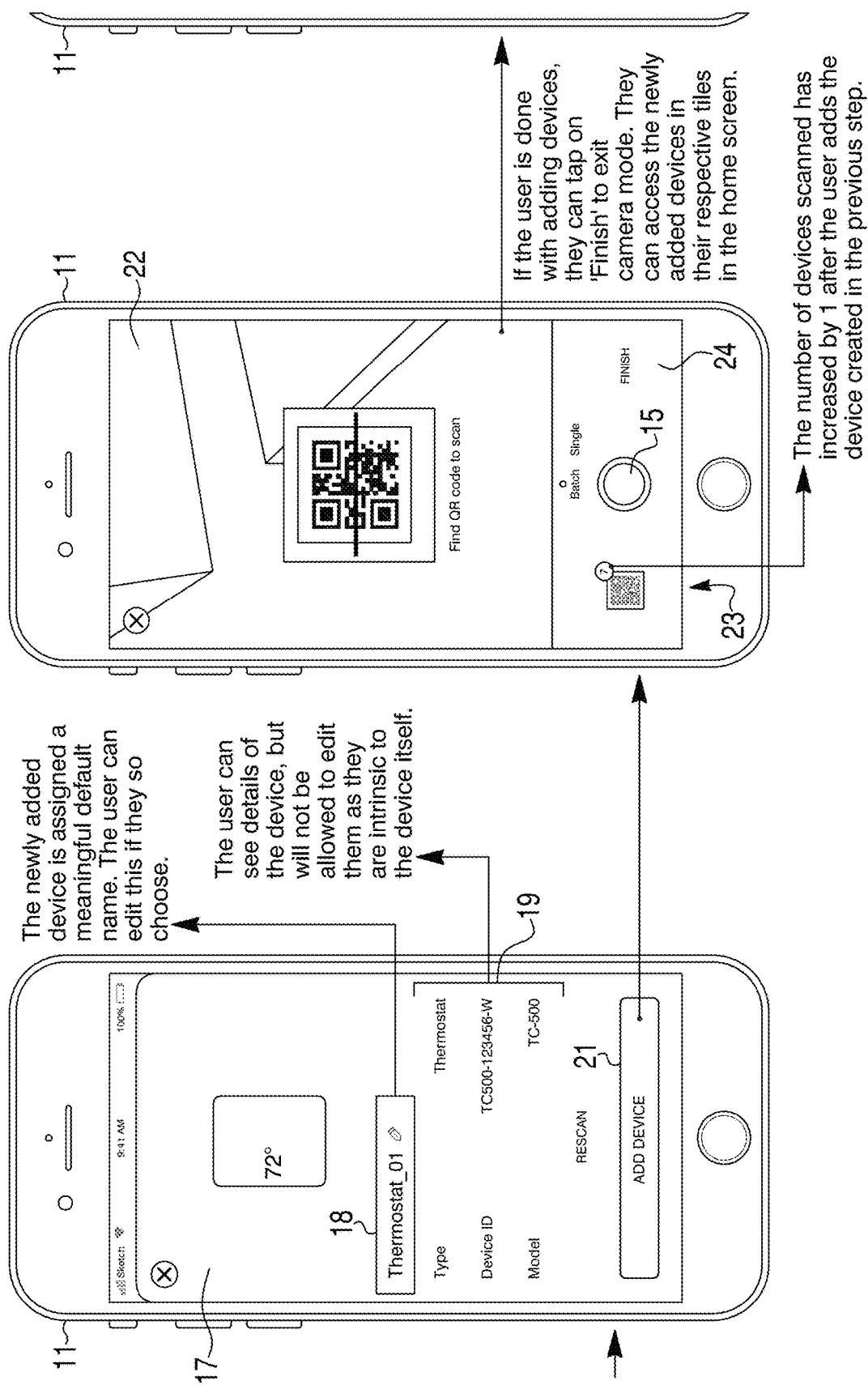

INTUITIVE TERMINAL ASSIGNMENT AND WIRING DIAGRAM FOR A BUILDING MANAGEMENT SYSTEM

CROSS-REFERENCE TO RELATED APPLICATIONS

This application claims priority pursuant to 35 U.S.C. 119(a) to India Patent Application No. 202011026345, filed Jun. 22, 2020, which application is incorporated herein by reference in its entirety.

BACKGROUND

The present disclosure pertains to building management systems, and particularly to configuring as it relates to various aspects and components of such systems.

SUMMARY

The disclosure reveals building management systems, such as small or medium businesses, having one or more control devices. Assigning codes to devices, and reading and listing them may aid in configuring the devices. Templates may be used for dynamic configuration of devices and equipment. Representing terminal assignments and wiring diagrams of control devices may be intuitive in that they resemble real hardware for ease of complete installation. The present system and approach may provide an intuitive way of securely registering devices with cloud usage, for example, involving a mobile phone with no manual entry of data so that a user can complete this process with ease. An intuitive, automatic and asynchronous device configuration downloading may be seen, such as to multiple control devices in a single shot. There may be seamless configuration data synchronization, for example, in view of replacement devices, or so the latest data is readily available.

BRIEF DESCRIPTION OF THE DRAWINGS

FIGS. 1A, 1B and 1C reveal bulk adding new devices by scanning a code;

DESCRIPTION

Figure 1A:
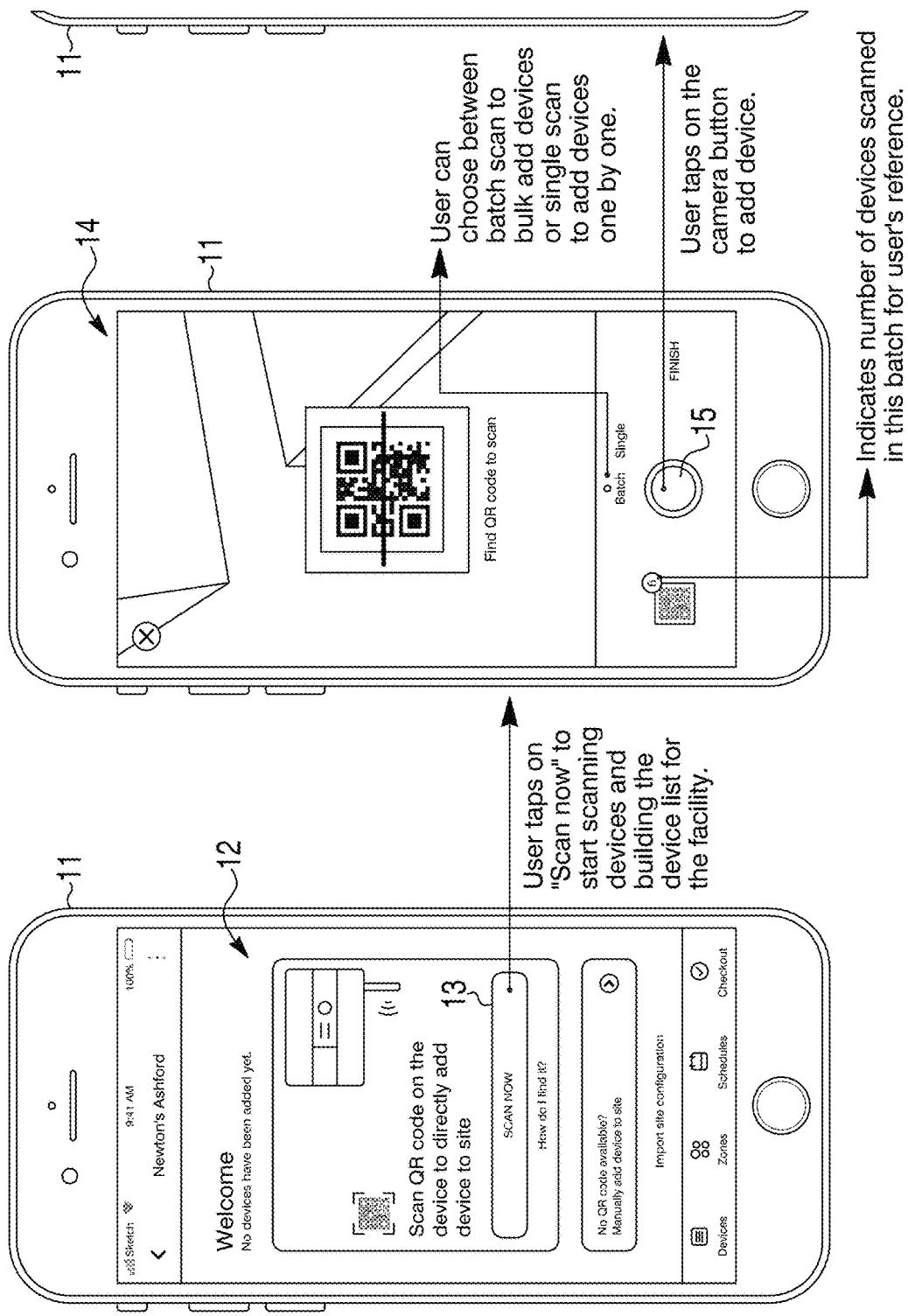

The present system and approach may incorporate one or more processors, computers, controllers, user interfaces, wireless and/or wire connections, and/or the like, in an implementation described and/or shown herein.

This description may provide one or more illustrative and specific examples or ways of implementing the present system and approach. There may be numerous other examples or ways of implementing the system and approach.

A small or medium business (SMB) is a term used herein where an SMB may have less than 500 employees and gross annual sales less than $100 million. Other criteria may be used to describe an SMB.

One may note a system for device addition or replacement that uses a code scan. The present system and approach may be about an easy way of creating a device list for a facility, or replacing an existing device while also automatically populating basic mandatory details about the device in the system. The present approach for a building management system (BMS) may consist of two key components, control devices and a small or medium business (SMB) deploy app. The SMB deploy app may be used to configure, commission and checkout the control devices like a smart input output (IO), a thermostat which controls BMS equipment like an air handling unit (AHU), lighting, variable flow refrigerant (VRF), and so forth. Each hardware/control device may be shipped from a factory to a customer with a unique two-dimensional code (e.g., a QR code) attached to the device in a sticker format. The description herein may refer to the QR code as an illustrative example. There may be other kinds of two-dimensional codes used in the present description. The QR code may contain a high volume of data and describe device details, including but not limited to device type, for instance, a Model/SKU, device universal unique identifier (UUID), and so on, for each device that comes with it. The user may begin configuring the system for a facility or site by creating a logical list of devices that is required for complete configuration. A physical device UUID may be assigned to each logical device in the device list and further parameters may be configured as per a specification. During the creation of the device list, the user may be presented an option to scan the device QR code to add devices. On selecting the scan option, the tool may go into a QR code scanner mode, and prompt the user to scan the QR code sticker attached to the device.

The user may point a camera of the tool at the attached sticker and scan the QR code. Upon successfully scanning the QR code, the device details may be read into the tool. The tool may generate a default name for the device and automatically populate all the details read from the QR code into the respective fields in the device configuration user interface (UI). These details may include, but are not limited to, a device type, Model/SKU, device UUID, and so forth. The tool may also persist these details in a local database. The user may use the QR code scanning approach even after the creation of the device list, in the device configuration step of the process. In case the user has created a logical device manually, and wants to assign a physical device to it, the user may do so by scanning the QR code.

Even in this case, the aforementioned steps by which the app reads and populates all available details in the device configuration user interface (UI) as well as in the app database, may incur hindrances. In the event that a user scans an invalid device type, i.e., in case the user scans a QR code of a thermostat to assign to a smart IO, the tool may notify the user that the user scanned the wrong device type and thus prevent the process from going forward. In the event that the user scans the same QR code for two different devices in the same system, the tool may notify the user that the user scanned a duplicate device and prevent the process from going forward. In the event that the user does not have access to the hardware or the QR code sticker, the user may have an option to manually enter all these details. In general, the tool may automatically validate the device type and ensure that the right device is mapped to the right type and model, and the right logical entity before populating the same in the UI as well as persisting in the local database.

The present process may be done regardless of whether the device is installed in the actual facility. So, the user may complete all of the configuration, commissioning and checkout processes remotely, thus reducing the need for a site visit and onsite effort.

Bulk scanning a QR code may be noted. When a user enters the QR code scanning mode, the user may be presented with an option to scan a single QR code at a time, or batch scan QR codes. On selecting a "batch" scan option, the user may batch scan QR codes in quick succession.

Upon scanning one QR code, the user may be presented with the details captured from the QR code. The user may confirm these details and add device. After adding the device, instead of navigating to the device list, the user may be redirected to the QR code scanner mode, and the process may be repeated until all the devices are scanned and added to the device list. During this time, the tool may create the device list complete with all of the details read from the QR code in the background. Once the user indicates that the user is "finished" scanning, the user may be presented with a complete list of all devices scanned thus far, including all of the details read from the QR code in the respective device configuration UI. This approach may improve efficiency and effectiveness, reduce a scope of error, and drastically cut down on user fatigue and time taken to set up device list.

One may wish to seamlessly replace a damaged/outdated device. In a situation where a device in the existing system is needed to be replaced by a new device of the same type, the user may use the QR code method to easily perform the task. The user may initiate a "replace device" workflow in the device configuration page. The tool may enter the QR code scanner mode and prompt the user to scan the QR code of the new device. The UUID of the old device may be replaced by the UUID of the new device. After successfully assigning the new UUID to the logical device, the tool may automatically upload the configuration data to the new device. After the configuration is uploaded, the new device may seamlessly function in the place of the old device.

In general, the present system may be about an easy way of creating a device list for a facility, or replacing an existing device by scanning the QR code affixed to each hardware device in a sticker form. It may be a way to encode details of a hardware device, including, but not limited to, device type, Model/SKU, device UUID, and so on, in a unique QR code that is attached to a device in a sticker form. Each device may be shipped with the unique QR code attached to it in a sticker format. The user may scan the QR code to automatically add a device to the device list. The user may scan the QR code to assign a physical device to an already added logical device in the device list. The user may scan the QR code to read details about the physical device and populate them in the device configuration UI. The user may scan the QR code to persist the encoded device details in the local database. The approach may be for quickly building a device list complete with device details for a facility by scanning single/multiple QR codes for devices in one go. The user may scan devices separately, one at a time to add devices and their respective details one at a time to the device list.

The user may scan devices in "batch" mode, to add devices and their respective details in bulk to the device list. The app may read the data in the QR code and validate that the right device is being assigned to the right logical entity. The app may read the QR code and validate that the same physical device is not assigned to multiple logical devices in the same device list.

User may use this approach to complete all of the configuration, commissioning and checkout processes remotely, thereby reducing the "need" for a site visit and onsite effort. The user may scan a new device to assign to an existing device of the same type for a replacement purpose. Once reassigned, the tool may automatically upload the configuration data to the new device. This approach may save installation time and thus costs to the installer. This approach may be easily performed by a novice user, thereby eliminating the need for training time and costs. Easy device creation process may immensely reduce the cognitive load on the user. Easy replacement through this approach may drastically reduce the down time for replacement and maintenance in a facility. The user may use this approach to complete all of the configuration, commissioning and checkout processes remotely, thereby reducing the "need" for site visit and onsite effort.

Figure 1C:
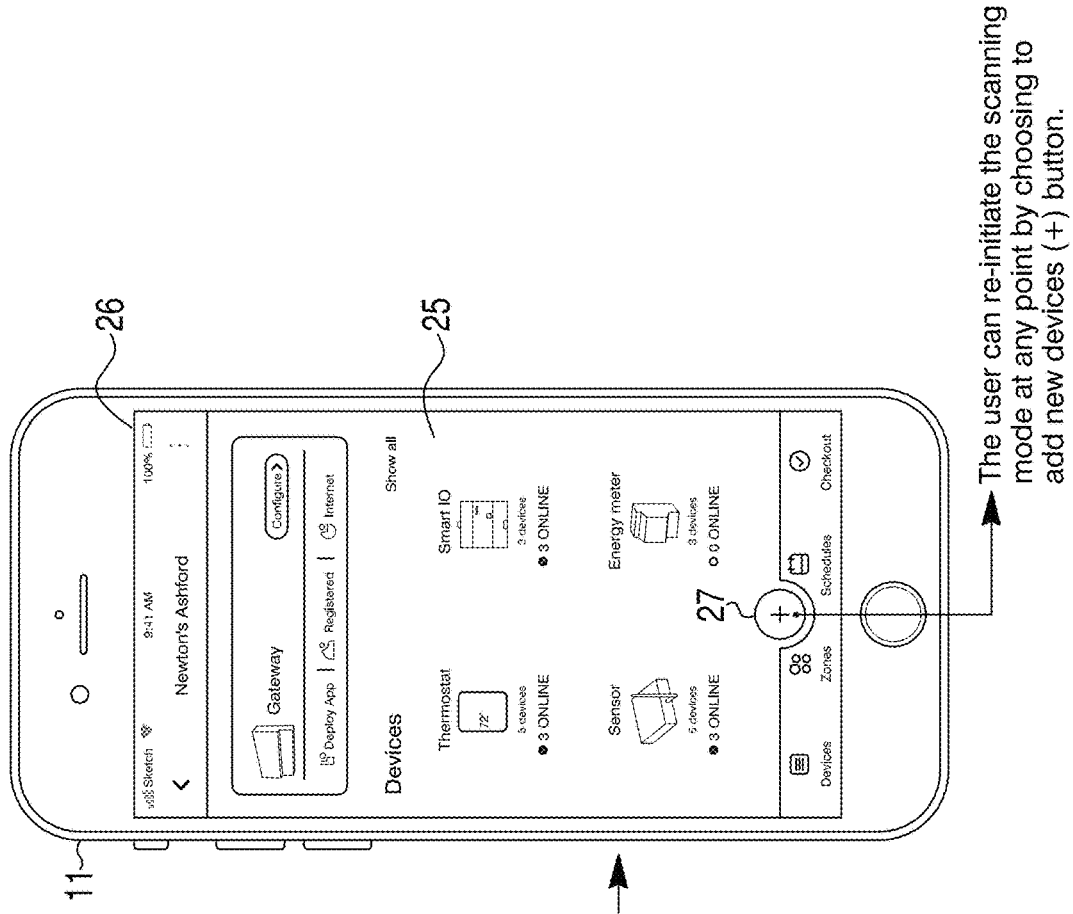

FIGS. 1A, 1B and 1C reveal bulk adding new devices by scanning a code. FIG. 1A shows a mobile phone 11 with a "Welcome" page 12. A user may tap a "Scan now" button 13 to start scanning devices and build a device list for a facility. The next page 14 of the phone shows a QR code for scanning. The user may choose between a batch scan to bulk add devices or a single scan to add devices one by one. The user may tap on a camera button 15 to add a device. To the left of camera button 15 is an indicator 16 that shows a number of devices scanned in the present batch for a user's reference.

FIG. 1B shows a page 17 on phone 11, revealing a newly added device which may be assigned a meaningful default name such as "Thermostat_01", at location 18. The user may edit the name. The user can see details 19 of the added device, but may not be allowed to edit the details since they are intrinsic to the device itself. The user may check details and tap an "Add device" button 21 to proceed. Since the system is in "Batch", the user is redirected to the camera to scan in the next device as shown on a page 22 of phone 11. Area 23 on page 22 may show a number of devices scanned thus far.

One may look to a page 22 of phone 11 in FIG. 1B, and if the user is done with adding devices, the user may tap on a "Finish" button 24 to exit the camera mode. The user may access the newly added device in their respective tiles 25 in a home screen 26 of phone 11 in FIG. 1C. The user may re-initiate the scanning mode at any point by choosing to add new devices by pressing a (+) button 27.

Figure 2A:
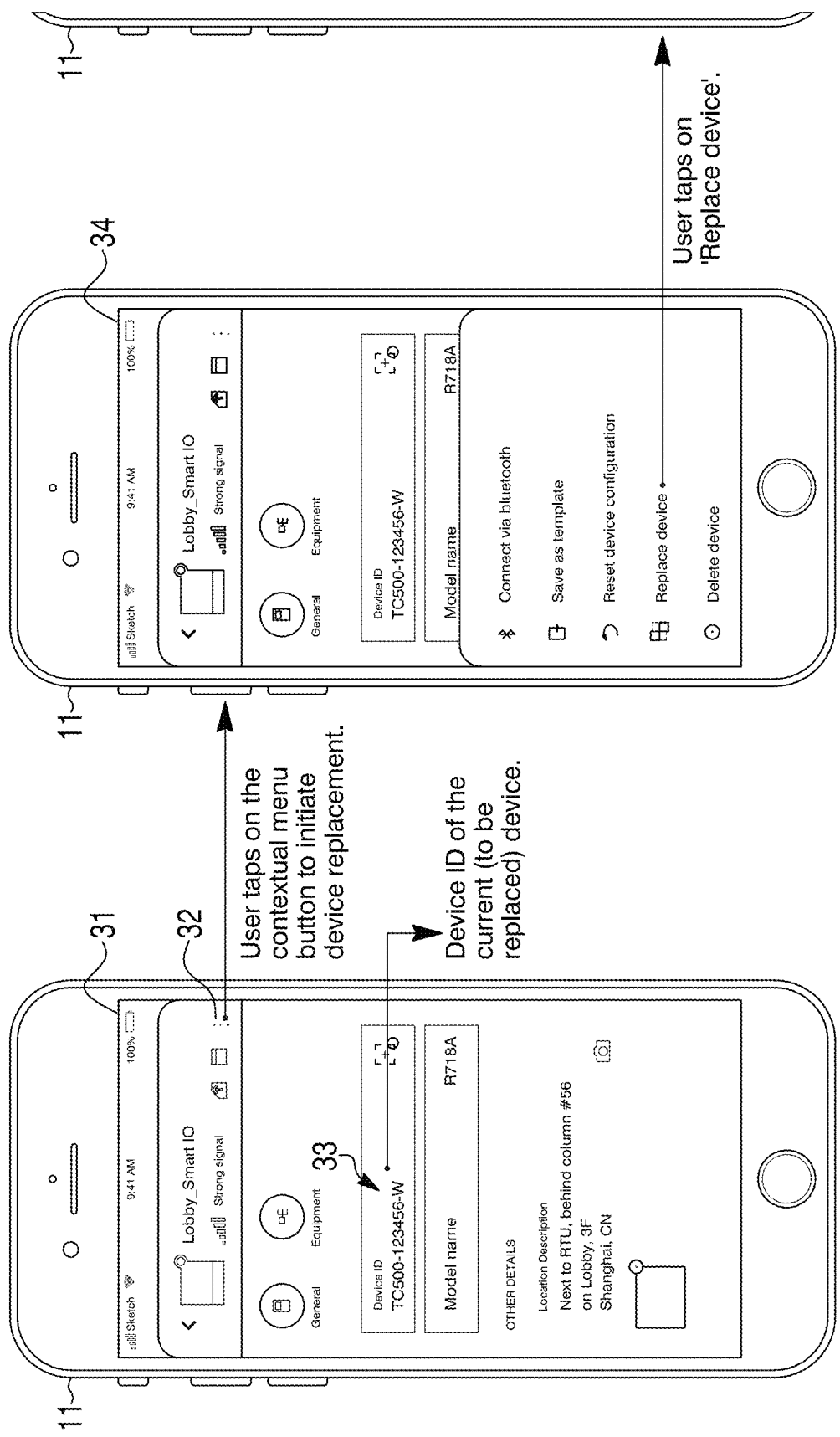
FIGS. 2A, 2B and 2C reveal scanning or coding to replace devices.
Figure 2B:
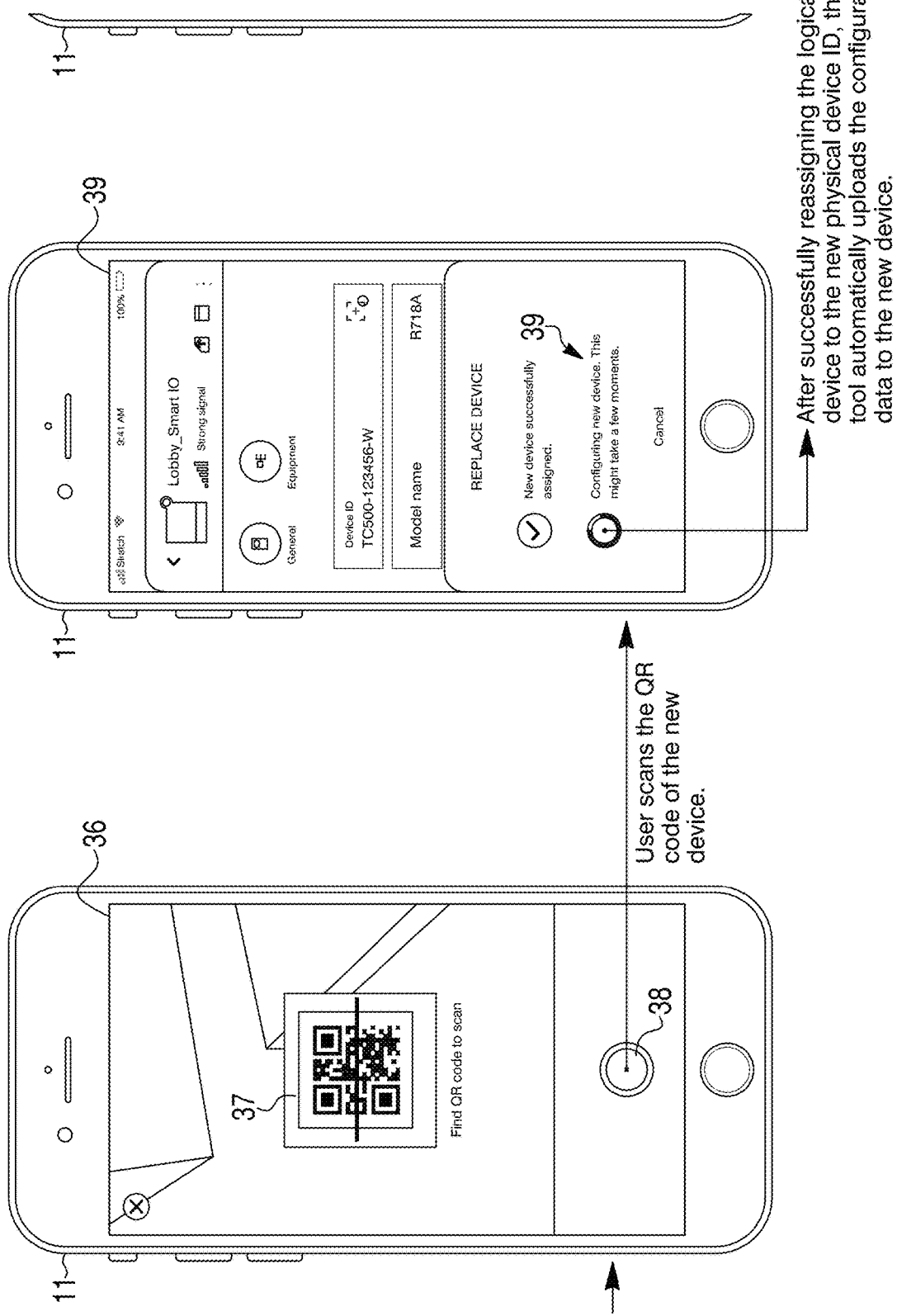
Figure 2C:
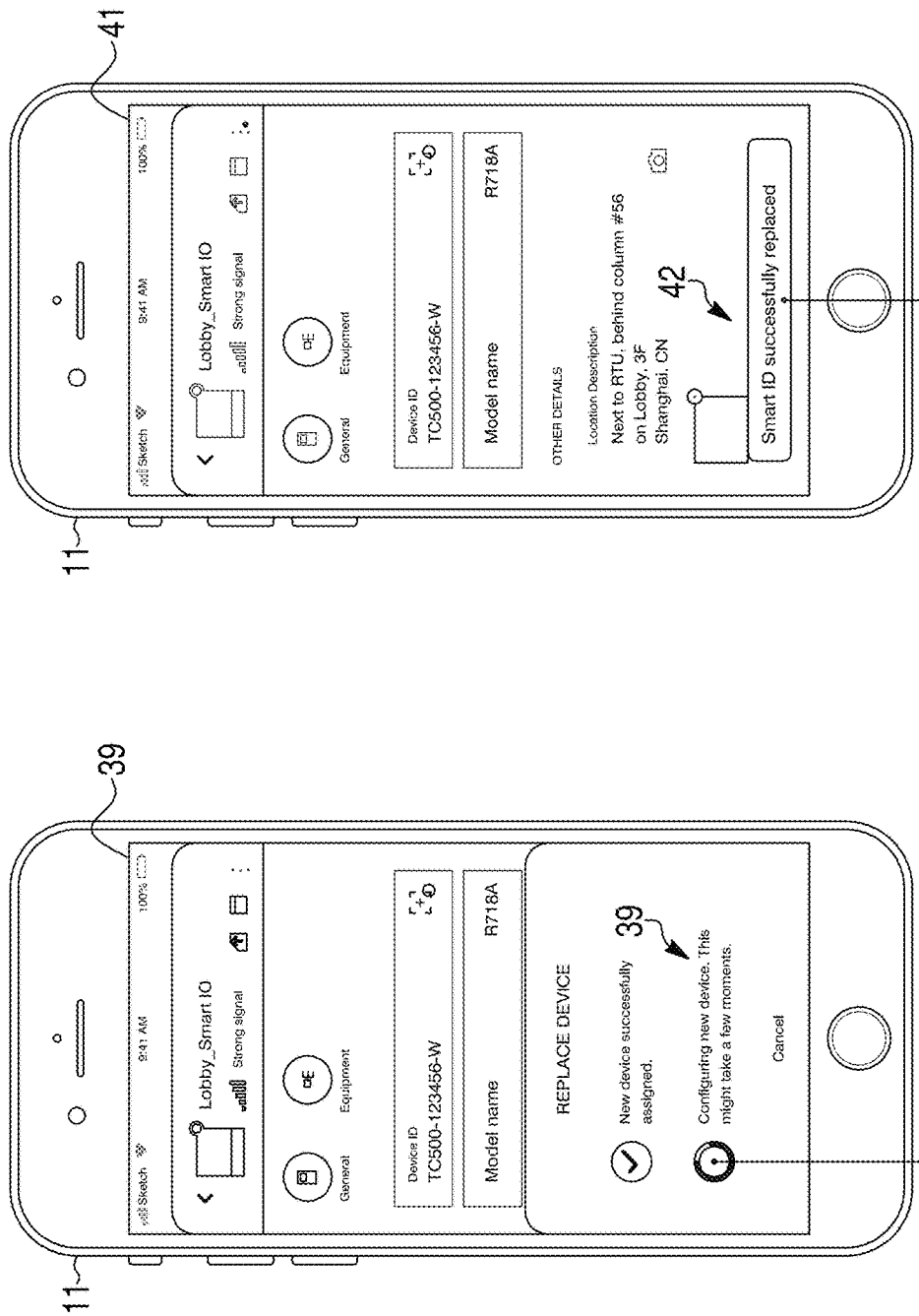

FIGS. 2A, 2B and 2C reveal scanning or coding to replace devices. On page 31 in FIG. 2A of phone 11, a user may tap on a contextual menu button 32 to initiate device replacement. A device ID of the current (to be replaced) device may be shown at area 33 of page 31. After pressing contextual button 32, one may get a page 34. Toward the bottom of page 34, the user may tap on "Replace device" in area 35 of page 34, to get a page 36 of phone 11 in FIG. 2B that shows a QR code of a new device. The user may scan the QR code 37 tapping a button 38 toward the bottom of page 36. Then a page 39 of phone 11 may show a "Replace Device" where the new device is successfully assigned as indicated while the new device is being configured at area 39. After successfully reassigning the logical device to the new physical device ID, the tool automatically uploads the configuration data to the new device. After the configuration is uploaded, an area 42 on page 41 of phone 11 in FIG. 2C, shows that the old device is indicated to be successfully, and that the new device seamlessly functions in place of the old device.

One may note a system for dynamic configuration of devices/equipment using templates. In building management system dynamic configuration of devices/equipment's using templates, especially in small and medium sized buildings (like Restaurants, supermarkets, and so forth), maintaining comfort (HVAC, Lighting, energy, blinds, and so on) with low cost and low man power is essential. Also, in this market segment, the common needs are controlling typical BMS equipment like Roof top units (RTU), variable refrigerant flow (VRF/VRV), lighting, boiler, air handling unit, chiller, and so on, with simple on/off based or occupancy based schedules.

As these equipment specifications and variants differ from region to region, it appears important to provide flexibility without complexity. Also, customers of the small medium segment cannot afford to employ high skilled personnel's to install, configure and commission the building management system. Thus, this calls for more and more out of the box equipment configurations/specifications so that users can readily choose the configuration that most suits to their region/buildings. Also, the controllers that control the equipment like thermostats, smart IOs and additional devices, such as outdoor air temperature sensors, mixed air temp sensors, and so on, need their own configuration. Even the present configuration should be to be out of the box, so that even low skilled personnel can complete installation, configuration and commissioning with in short span of time.

All these needs may demand intuitive templates that can provide equipment's, devices, sensors configuration readily so that users can choose a template and entire configuration comes up by default.

The present system and approach may be about an intuitive way of providing all of the configurations of equipment and control devices with various combinations as templates, which are used in an SMB mobile app so that installation, configuration and commissioning of these devices are made easier.

In the present system and approach, equipment and device configurations needed for various equipment like VRF, AHU, RTU, and so on, may be built as a fixed application with enough flexibility. The application may be built using any standard engineering tools like Niagara, CPO studio, and so forth. The application may then be converted into number of template files.

In the SMB context, an application (e.g., RTU) may be designed in such a way that all of the parameter values that can be changed by users based on site needs are exposed as BACnet points in the application. Each parameter from templates may be exposed in SMB mobile app UI as one single parameter with an intuitive/meaningful name, with most common values as default values. Also, depending on a control device to be used, the input output terminals may be dedicated to specific types of input/output devices like occupancy sensor, and so on, in the application.

Each template file may be a Java Script Object Notation (JSON) file with the configuration information, i.e., parameter name and value, pertaining to an equipment or device.

Templates may include device templates, equipment templates, property templates, schedule templates, alarm templates, UI profile templates, rules templates, and so forth. A device template may consists of details of all the application parameters with their equivalent BACnet point names, types, possible values, and so on, for a given control device (e.g., a thermostat) along with the device's general details. The device template may also consist of IO terminal specifications. For example, an occupancy sensor may only be connected to UI terminals 1 or 2. The terminal specifications may also consists of a list of compatible equipment. This information may be used by a mobile app to automatically assign IO terminals as and when the user selects devices.

An equipment template may consists all of the parameters for a given piece of equipment with commonly used values as default values. For example, in case of an RTU application, "Conventional 2 heat, 2 cool" may be one equipment template. When a user selects this template, an entire RTU application with the conventional equipment type with 2 stage heating and 2 stage cooling and all other parameters with default values that are applicable for 2 heat 2 cool, will be readily available in the mobile app.

The property template may consist of properties of IO devices with commonly used values as default values. These IO devices may include, but are not limited to, an occupancy sensor, an outdoor air temperature sensor, mixed air sensor, a dirt filter, a CO2 sensor, and so forth. The properties may include, but are not limited to, an IO characteristic (0-10V), a device type (NTC 20 K), an offset of OAT, an engineering unit, a relinquish default, and so forth.

A schedule template may consist of a default schedule with time values and events, exception schedules and calendars. For example, equipment should be switched off by default and switched on/run only during 6 AM to 6 PM of every week day, i.e., Monday to Friday.

An alarm template may consist of alarm configuration information like high limit, low limit, severity, with commonly used values as default values. For example, if a temperature set point is below 40° F. (low limit) and above 120° F. (high limit), it may raise an alarm to a supervisor with medium severity.

UI profile template may consist of details of UI controls for each parameter to be displayed so that a UI is rendered dynamically in a mobile app UI. These details may include, but are not limited to, a parameter display text, possible values, default value, font style, font size, font color, alignment of UI control, placement of UI control, and so on.

A rules template may consist of rules pertaining to an IO terminal assignment, for example, which sensor is to be assigned to which terminal, and so on, rules for showing only related configuration parameters for a given parameter's selected value. For example, if a user selects an RTU type as a heat pump, only heat pump related configuration should show up.

As per a workflow in the SMB deploy app, each of these templates may be used to dynamically render the UI to populate a device and equipment configuration. Also, when a user chooses 1 device and 1 piece of equipment, all the properties, schedules, alarms, IO terminal assignments related data with default values may be updated in a mobile app's local database and the same may be displayed to the user for further modification. Thus, using a template's entire configuration of a given device/template may be readily available in the mobile app.

The present system and approach may be about an intuitive way of providing all the configuration parameters of a control device and the equipment, with the most common values as default values wrapped as templates. The equipment may include roof top units, AHU, VRF, lighting, boiler, and so forth. Devices may include a thermostat, smart IO, and so on.

The approach may a mobile app getting a configuration from templates and updates into its local database. The configuration may include, but is not limited to, application parameters with default values and possible values, BACnet points mapped with application parameters, IO terminal details, schedules, alarms, and more.

The present approach may have an entire configuration of equipment and control device readily displayed to the user so that the equipment/device can work out of the box. Each parameter from templates may be exposed in the SMB mobile app UI as one single parameter with an intuitive/meaningful name and a value as given in the template. Each template file may be a JSON file with the configuration information, i.e., a parameter name and value, pertaining to a piece of equipment or a device.

To restate, the templates may briefly be defined as a device template, equipment template, property template, schedule template, alarm template, UI profile template, rules template. The device template may have compatible equipment, application parameters with BACnet object mapping and IO terminal specifications. The equipment template may have parameters for a given equipment with commonly used values as default values. It may also have a list of compatible IO devices such as sensors, valves, actuators, and the like. The property template may have properties of IO devices with commonly used values as default values. The schedule template may have a default Schedule with time values and events, exception schedules and calendars. The alarm template may have alarm configuration information like high limit, low limit, and severity with commonly used values as default values. The UI profile template may have details of UI controls for each parameter to be displayed so that the UI is rendered dynamically in the mobile app UI. These details may include parameter display text, possible values, default values, font style, font size, font color, alignment of UI control, placement of UI control, and more. The rules template may have rules pertaining to IO terminal assignment, rules for showing only related configuration parameters for a given parameter's selected value.

As per the workflow in the SMB deploy app, each of these templates may be used to dynamically render the UI to populate device and equipment configuration. Also, when user chooses 1 device and 1 equipment, all the properties, schedules, alarms, IO terminal assignment related data with default values may be updated in a mobile app's local database and the same may be displayed to the user for further modification.

The mobile app may map information from respective templates using the property name as an identifier. Once a user chooses a template, the use can also customize the parameter values, and save it as custom template which can be used further in other sites. The templates may be deployed in the cloud and the mobile app may import them on a first login and store them locally so that the app can continue to use them when there is no internet connectivity to the mobile.

While the present configuration is being pushed to the respective control device from mobile app, again the app may use templates to get the actual BACnet point details to which each configuration parameter is mapped to and uses these details (point name, instance id, type, and so on) to download the data.

Figure 3A:
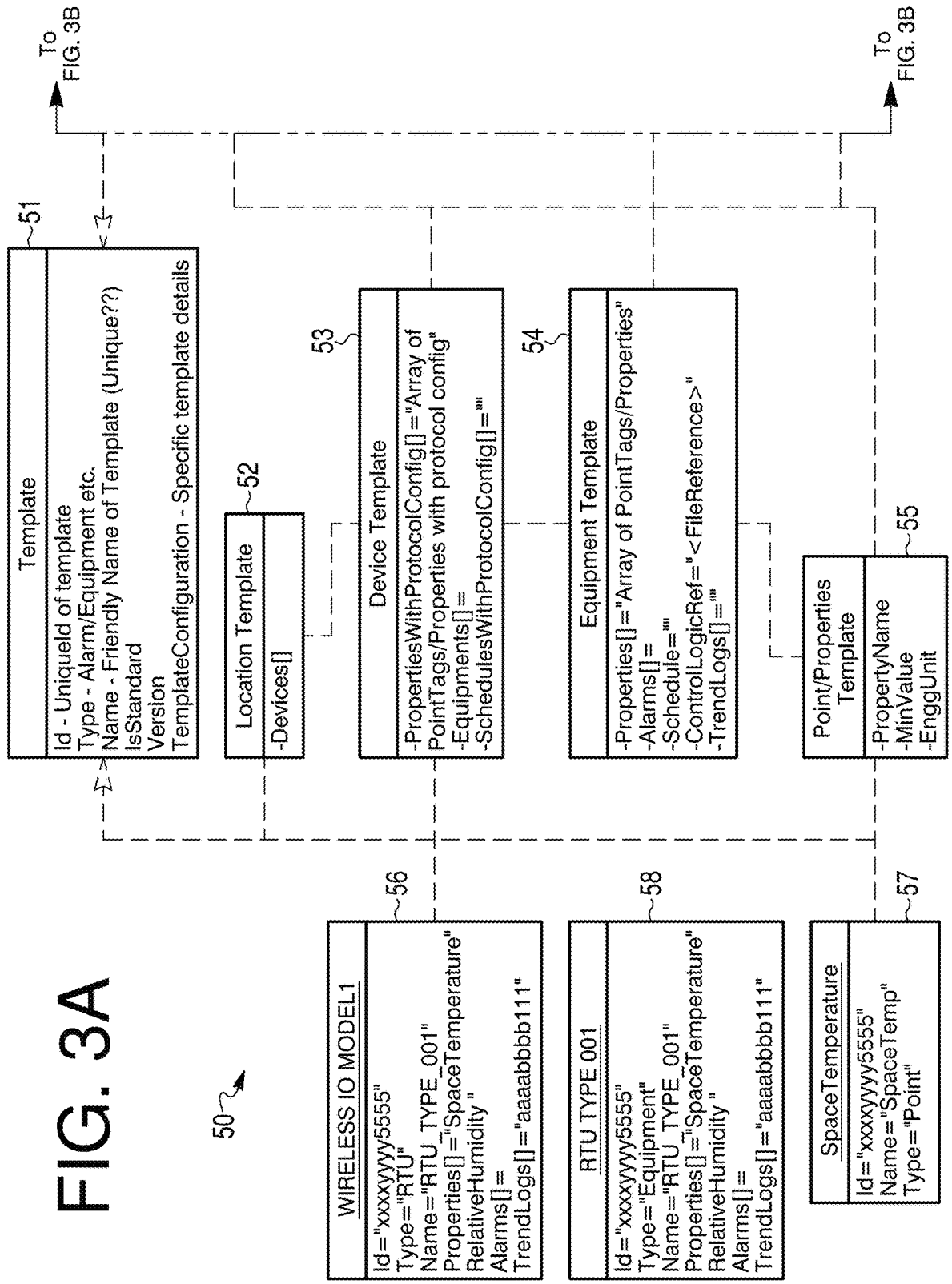
FIGS. 3A and 3B are diagrams of a template layout.
Figure 3B:
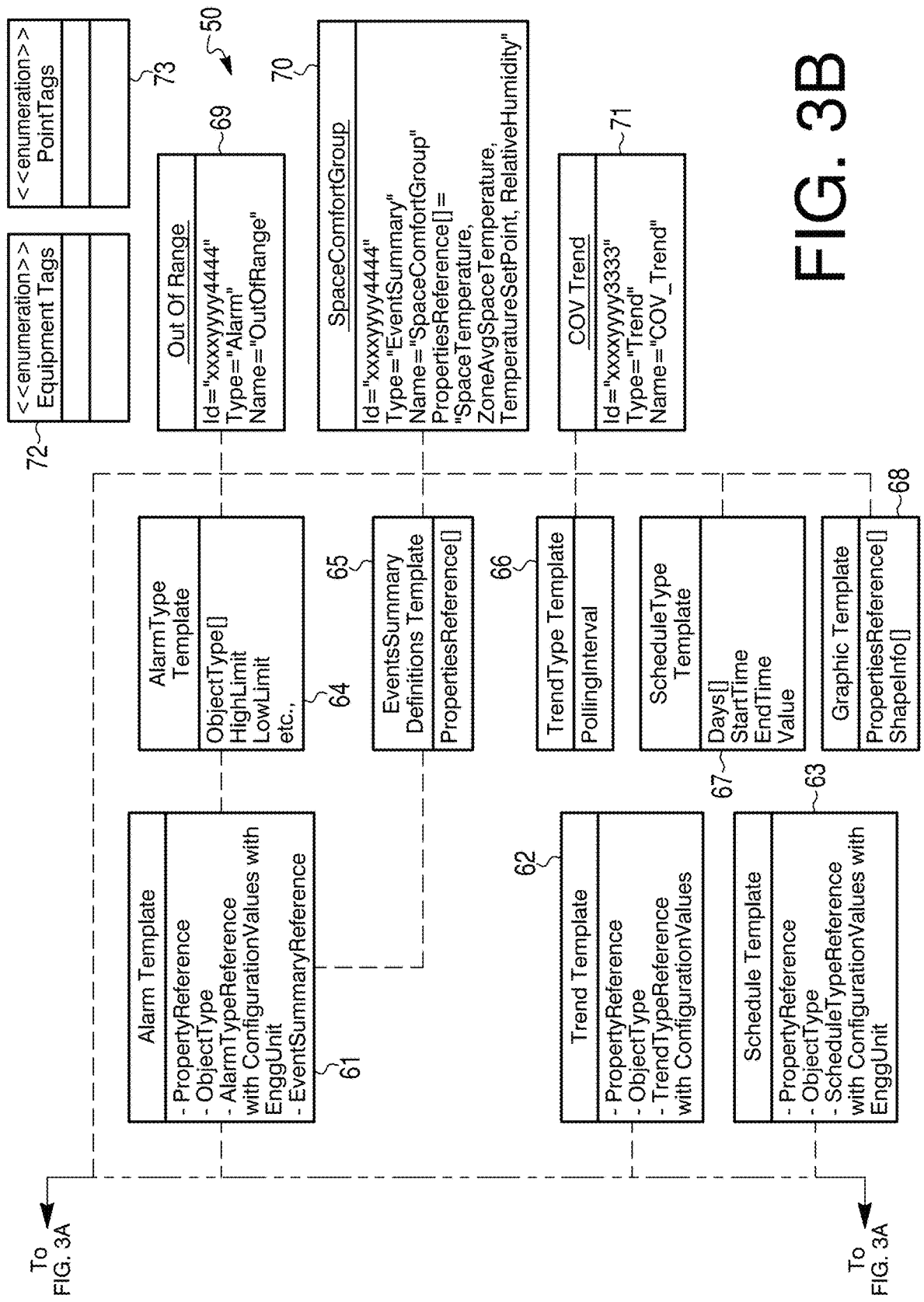

FIGS. 3A and 3B are diagrams of a template layout (i.e., a solution description) for a configuration of devices and equipment. The items may be regarded as intuitive templates. Each template may have specific information and features of the devices and equipment referred to in the respective template blocks. The templates may be connected by dashed or dotted lines. The diagram shows an illustrative arrangement of templates. There may be other arrangements of templates.

In FIG. 3A, a location template 52 for devices may be connected to a main template 51. Location template 52 may also be connected to a device template 53, which may be connected to template 51 and an equipment template 54. Equipment template 54 may be connected to a point/properties template 55, which may be connected to template 51. A wireless IO model 1 block 56 and space temperature block 57 may be connected to template 51. RTU type 001 block 58 may be associated with block 56 and block 57.

In FIG. 3B, an alarm template 61 may have connections with templates 53-55. Template 61 may also be connected to trend template 62 and schedule template 63. Alarm template 61 may also be connected to alarm type template 64 and event summary definition template 65. Trend type template 66, schedule type template 67 and graphic template 68 may be connected to template 51. Out of range block 69 may be connected to alarm type template 64. Space comfort group 70 may be connected to event summary definitions template 65, and COV trend block 71 may be connected to trend type template 66. There may also be a tags block 72 and a point tags block 73 in diagram 50.

Figure 4:
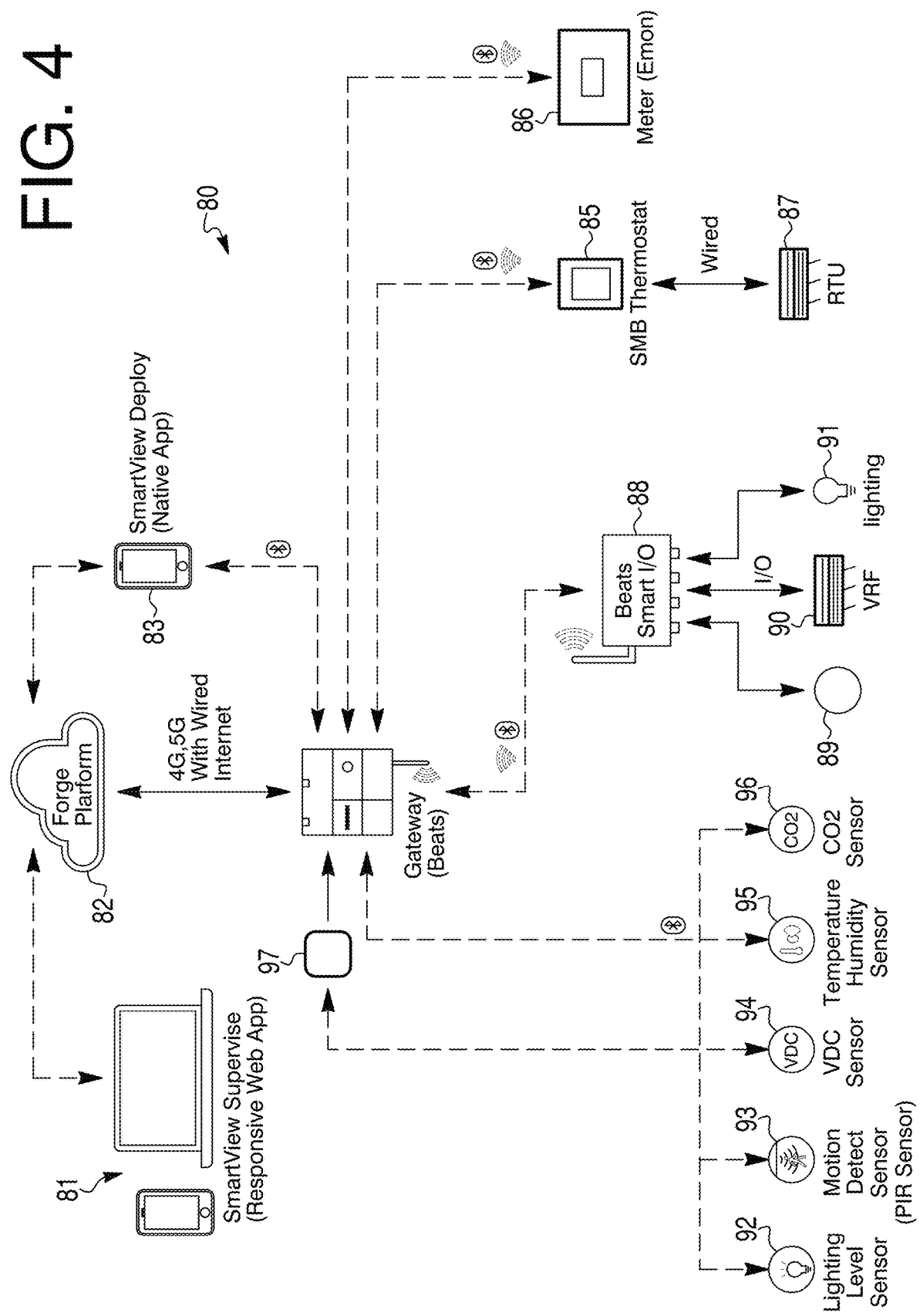
FIG. 4 is a diagram of an a small and medium business architecture.

FIG. 4 is a diagram of an SMB architecture 80. There may be a smart view supervisor (a responsive web app) 81 with a web portal, which may be connected to a Forge platform or some other kind of platform in a cloud 82. Cloud 82 may be connected to a smart view deploy (native app) 83. Supervisor 81, cloud 82 and deploy app 83 may be connected to a (beats) gateway 84. An SMB thermostat 85 and a meter (Emon) may be connected to gateway 84. Thermostat 85 may be connected to an RTU 87.

A (beats) smart IO 88 may be connected to gateway 84. A sensor or sensors 89, VRF 90 and lighting 91 may be connected to smart IO 88. A lighting level sensor 92, a motion detect sensor (PIR sensor) 93, a VOC sensor 94, a temperature/humidity sensor 95 and a $CO_2$ sensor may be connected to gateway 84. The connections of the sensors may be via a Zigbee hub 97. Connections among the components of architecture may variations of wireless and wire designs. The gateway may of various kinds, such as Modbus and so forth.

One may note an intuitive terminal assignment and wiring diagram for a building management system. Terminal assignment and ensuring devices are wired correctly may be a challenging and time consuming task in building management system.

The present system and approach may be a way of representing terminal assignments and wiring diagrams of BMS devices in that they resemble the real hardware for ease of complete installation, terminal assignment and wiring.

A present system and approach may incorporate a smart IO and thermostat controllers with fixed application/control logic that controls typical BMS equipment like an AHU, VRF, lighting, RTU, and so forth. Application parameters may be configured using an SMB deploy mobile app. The controllers may have a fixed number of input output terminals/ports to which field devices are to be connected. For example, input devices may include an occupancy sensor, an outside air temperature sensor, and the like, and output devices may include a fan, damper, and the like. These input output devices may need to be configured in the SMB mobile app. The configuration may include which terminal of a controller that each IO device should be wired to, the IO characteristics, polarity, alarm settings, offset, and so forth. As per an application design, some of the IO terminals may be reserved to some input output devices. For example, DO1 may be reserved for a fan command in a thermostat application.

As and when a user configures the application parameters in the mobile app UI for a given controller, the mobile app may automatically build a point list based on a user's selection of configuration parameters and intelligently assign them to the right/compatible terminals in the mobile app. The auto assigned terminal view may then be presented to the user in such a way that a user interface of the application closely mimics the color coding and terminal numbering in the actual device. Thus, a user may easily identify the correct terminals to wire the desire I/O devices. The mobile app may also represent an intuitive IO terminal view with all the details needed to understand which terminal is assigned to which IO device.

Flexible terminal assignment may be noted. In case that a user has a particular requirement (spec driven or otherwise) to reassign the terminals, the user may do so by a simple drag and drop of the relevant I/O point to the required terminal, provided that the terminal can support the particular type of I/O point. A user may reassign terminals by first long pressing an I/O point name. The point may get unassigned and then pushed to a point "parking lot" where it stays until the user scrolls to the correct terminal. Once there, the user may drag and drop the point from the "parking lot". The system may only allow one to drop the matching slot to the point type. In case the user mistakenly drops it to the wrong terminal, the point may return to the "parking lot".

In case the desired terminal is already occupied, the points may get swapped, whereby the selected point gets reassigned and the second point (occupying the desired terminal) gets pushed to the "parking lot". The second point may then be reassigned as above.

In case all the terminals are already fully occupied, the user may perform a swap with the same point type. For example, to swap a point A and a point B position, user may just need to drag and drop Point B to Point A's slot and it will be automatically swapped and vice versa.

Once the user is satisfied with the assignment of terminals, the user may generate a wiring diagram for reference while in the field. The wiring diagram in such case may be again an intuitive representation of each wire that user needs to connect on physical hardware by mimicking the color, alignment, orientation and labelling as per the hardware.

For example, in order to wire 1 single input/output device, there may be multiple wires that need to be connected. The wiring diagram may provide exact details of each wire for each input/output device. For example, in order to connect an occupancy sensor, there should be two wires, one for ground and other wire for communication of a sensor.

When a user generates wiring diagram, the diagram may get copied as an image in mobile phone's gallery so that the user can access it quickly. The user may also pinch and zoom the wiring diagram so that only the terminal of focus can be viewed clearly.

The diagram may also clearly differentiate the free terminals from connected terminals so that user is clear while wiring the devices. The wiring diagram may be a visual guide to the user on how to wire the I/O devices so that the right devices are connected to the right terminals, thereby minimizing a scope of error during installation and commissioning.

The present system and approach may be about automatic assignment of terminals and providing an intuitive terminal assignment view and wiring diagram of BMS devices in such a way that they resemble the real hardware in the SMB deploy app. It may be an approach of exposing each IO device configuration and its terminal assignment as a BACnet point so that it can be configured using mobile app. It may also be an approach of building a point list automatically based on a user's selection of configuration parameters, and intelligently assigning the points to the right terminals in a mobile application such as an SMB deploy mobile app. The mobile app may also represent an intuitive IO terminal view with all the details needed to understand which terminal is assigned to which IO device. This may achieved by insuring that the user interface of the terminal assignment view closely mimics the color coding, orientation, alignment, look and feel and terminal numbering in the actual device.

In a case where the user may have a particular requirement (spec driven or otherwise) to reassign the terminals, the user may do so by a simple drag and drop of the relevant I/O point to a required terminal, provided that the terminal can support that type of I/O point.

The user may reassign terminals by first long pressing the I/O point name. The point may get unassigned and then be pushed to a "parking lot" where it stays until the user scrolls to the correct terminal. Once there, the user may drag and drop the point from the "parking lot". In an event that the user mistakenly drops it to the wrong terminal, the point may return to the "parking lot". Where the desired terminal is already occupied, the points may get swapped, whereby the selected point gets reassigned and the second point (occupying the desired terminal) gets pushed to the "parking lot". The second point may then be reassigned as indicated.

Figure 5:
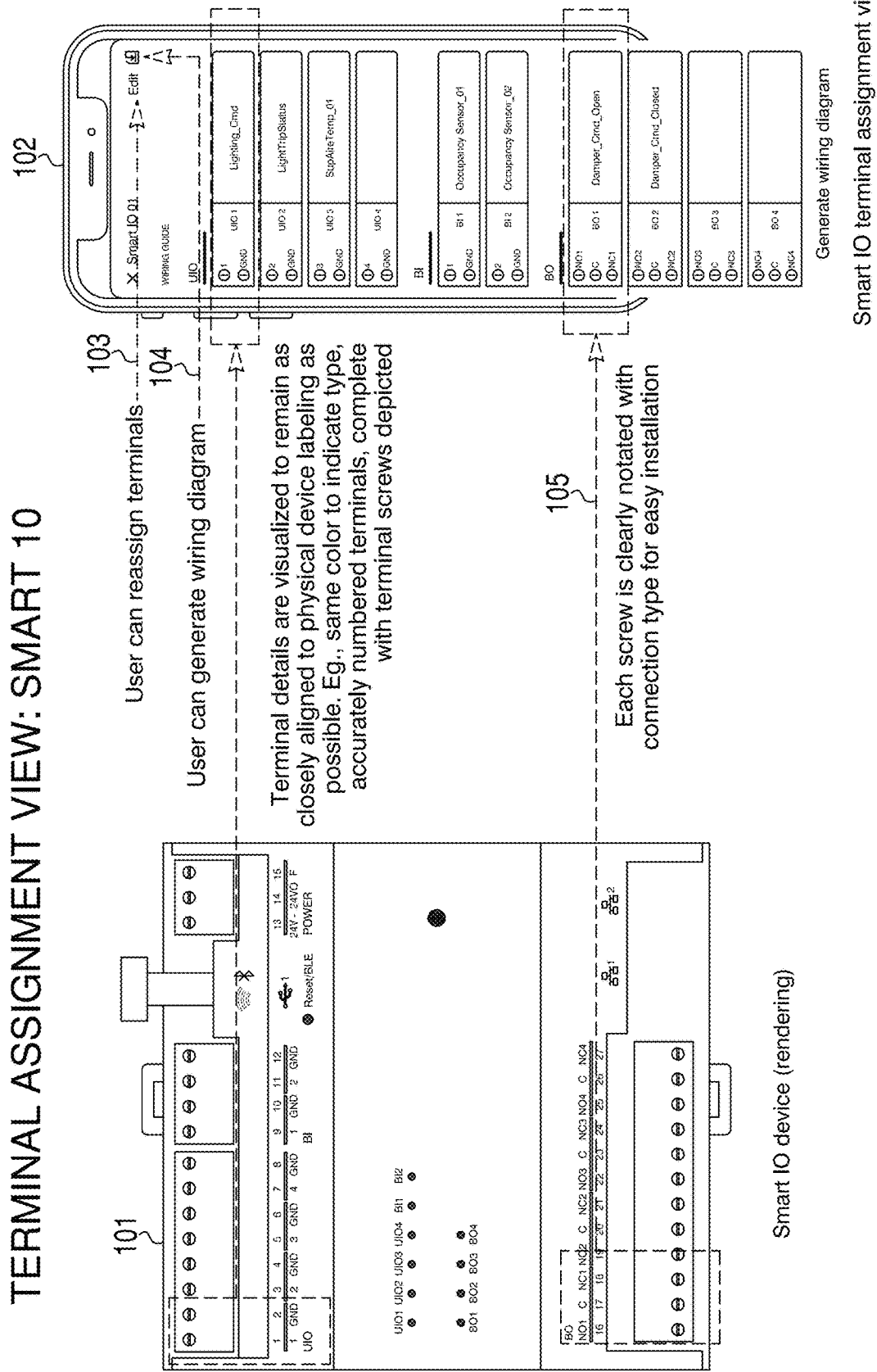
FIG. 5 is a diagram of a terminal assignment view for a smart input output (IO) device in conjunction with a smart phone with a smart IO terminal assignment view.

FIG. 5 is a diagram of a terminal assignment view for a smart IO device 101 in conjunction with a smart phone 102 with a smart IO terminal assignment view. A user may reassign terminals at an edit level 103. The user may generate a wiring diagram at level 104. Terminal details may be visualized to remain closely aligned to physical device labeling as are possible. For example, there may be the same color to indicate type, accurately numbered terminals, with terminal screws depicted at level 105. Each screw may be clearly notated with a connection type for easy installation as indicated at level 106.

Figure 6:
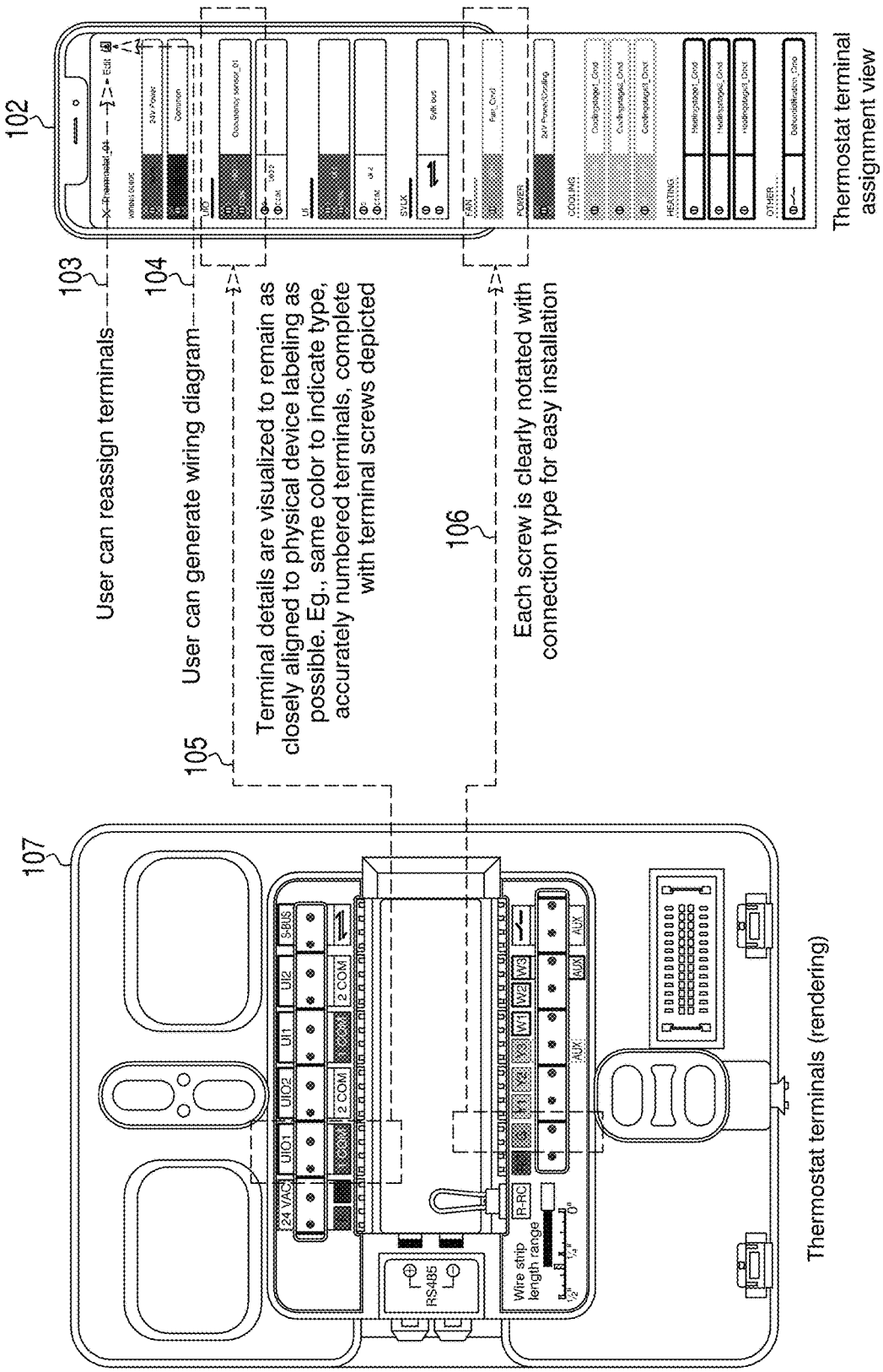
FIG. 6 is a diagram of a terminal view for a thermostat in conjunction with smart phone.

FIG. 6 is a diagram of a terminal view for a thermostat 107 in conjunction with smart phone 102. A user may reassign terminals at an edit level 103. The user may generate a wiring diagram at level 104. Terminal details may be visualized to remain closely aligned to physical device labeling as are possible. For example, there may be the same color to indicate type, accurately numbered terminals, complete with terminal screws depicted at level 105. Each screw may be clearly rotated with a connection type for easy installation as indicated at level 106.

Figure 7:
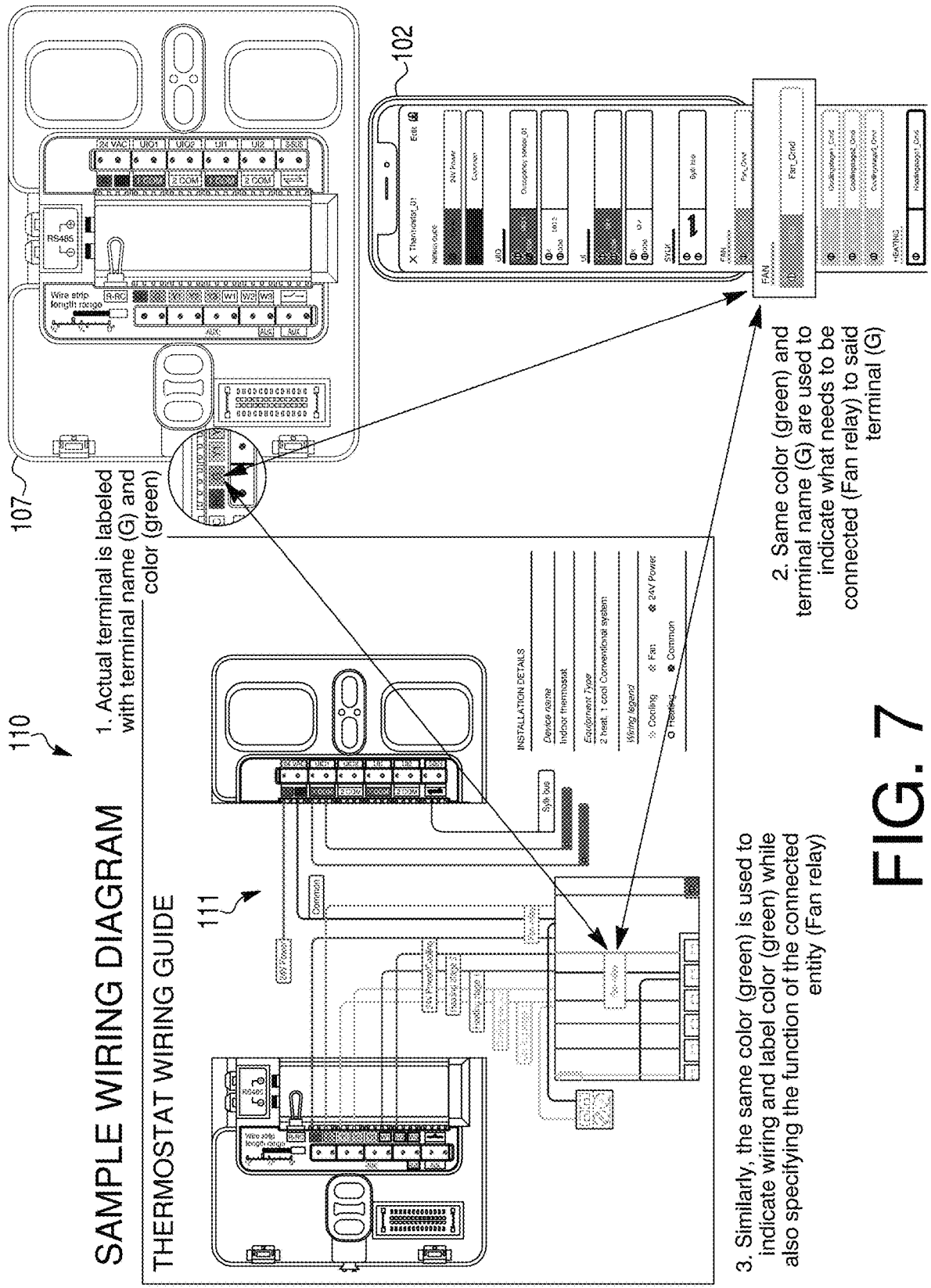
FIG. 7 is a diagram of a sample wiring diagram in view of a thermostat and a smart phone.

FIG. 7 is a diagram of a sample wiring diagram 110. At thermostat 107, an actual terminal may be labeled with a terminal name (G) and a color (green). At smart phone 102, the same color (green) and the terminal name (G) may be used to indicate what needs to be connected (e.g., fan relay) to the terminal (G). At a thermostat wiring guide 111, similarly, the same color (green) may be used to indicate the wiring and the label color (green), while also specifying the function of the connected entity (fan relay).

One may note configuration of devices for business management systems. There may be a secure and intuitive device registration and provisioning. With growing needs of cloud based solutions, it appears essential to provide an intuitive, easy and secure device management process for building management systems (BMS). The present system and approach may be an intuitive way of securely registering devices with cloud using a mobile phone with no manual entry of data so that a user can complete this process with ease.

In the present system, the components may be: 1) Gateway; 2) Devices/controllers; 3) Mobile app (SMB deploy) to configure devices; 4) Onboarding portal; 5) Sensors for monitoring; 6) Cloud; and 7) Supervisor.

A gateway should be registered with a cloud in order for the gateway to send telemetry data (e.g., room temperature) collected from the devices to the cloud. A supervisor may use this data and provide dashboards for monitoring. The SMB deploy may be a mobile app used to configure/register devices. An onboarding portal may be used to onboard new customers, sites that belong to customer, users that are associated to that customer/sites for SMB system/offering, and so on. Each user may set its own user name and password once the user is associated to a site. The SMB deploy app may be registered in an onboarding portal as a valid client that can use a customer, site, user's data of SMB offering, and so forth. The user may log into the SMB deploy mobile app using his/her user name and password. The mobile app may use onboarding application programming interfaces (APIs) to validate the user's credentials using Open Authorization (OAuth). After a successful validation, the mobile app may get gets user details such as a User Id, Name, Access Token, and so on, and a list of sites that user has access to using onboarding APIs and displays in the app. The User Id and Access Token may be used further in a device registration process. A user may tap on any site in order to configure the devices of that site in the mobile app.

The user may create a gateway and scan a QR code of the gateway (printed on its hardware). The mobile app may retrieve the serial number of the gateway and map the physical device with the logical device. The user may configure gateway with all the required parameters/details in the mobile app. Then, the user may push a configuration to the gateway via the mobile app along with the details of the site to which gateway belongs. The mobile app may connect to a gateway's access point over Wi-Fi. Once, the configuration is pushed, the gateway may get bound to the site. That is, the gateway may persists the information of site that it belongs to. The gateway may inform a status of internet connectivity to the connected client (the mobile app in this case) over web sockets. So, whenever the gateway is connected to the internet, the mobile app may get to know the status of internet connectivity and then automatically initiate gateway registration to cloud.

The mobile app may send all of the required information to the gateway as part of a device registration request. This information may include registration URLs/end points, that is URLs that that the gateway must use to register itself. The information may also include system/offering name/type. The offering name may be "Small and Medium Building". Further information may include the country in which the gateway resides, a User Id retrieved from onboarding APIs, User Access Token (access token for a given user is valid only for stipulated time), system ownership code (a GUID may be generated by the mobile app for each gateway uniquely), and a Site Id/Model Id (a site to which the gateway belongs. The gateway may call registration end points by using all the above information along with its MAC Id. The gateway may validate if the site Id received as part of request is the same site Id that it belongs to, to ensure that the user is registering the gateway to the correct/intended site. The gateway rejects the request if site Id's do not match.

A cloud registration API may authenticate if the user access token is valid for the given site, and rejects the request if access token is invalid or user is not authorized for that site. This may ensure that only an authenticated user, who is authorized/associated for the given site, from authenticated client (mobile app) is initiating the device registration.

The cloud may do a challenge—response authentication with the gateway to enable secure communication with the gateway.

Upon a successful registration, the cloud API may return the system GUID to the gateway by mapping it against the site Id and system ownership code in the cloud. The gateway may call provisioning end points using the system GUID so that all the resources such as IOT hub, annotation filters for telemetry, and so forth, get assigned in the cloud for that gateway.

If the user Id or access token expires, the mobile app may prompt the user to re-login to refresh the user id/access token. The present approach or process may ensure that there are no manual errors as entire process is automated and seamless. The user may just log into the mobile app and configure the gateway and a registration may happen automatically soon after the gateway is connected to internet, thus making the entire process seamless. Even though process may be explained for a gateway, it is applicable to any device that has to be registered with cloud.

To restate, the present approach may provide an automated, intuitive and secure way of registering a device (for example, a gateway, controller, and so forth) with a cloud. Devices may be registered dynamically on the site, by ensuring that the client/user performing registration process is authenticated, user is authorized to register that device for that site, and the user is registering the right/intended device for intended site. When the gateway is connected to an internet, it may automatically inform a status to the mobile app over web sockets when the mobile app is connected to the gateway's access point. The gateway may inform the status of internet connectivity to the connect client, which is the mobile app in this case, over web sockets. So, whenever Gateway is connected to Internet, app gets to know the status and automatically initiates gateway registration to cloud.

The onboarding portal may be used to onboard new customers, sites that belong to a customer, and users that are associated with that customer or sites for the SMB system/offering. Each user may set its own user name and password once they are associated to a site.

Figure 8:
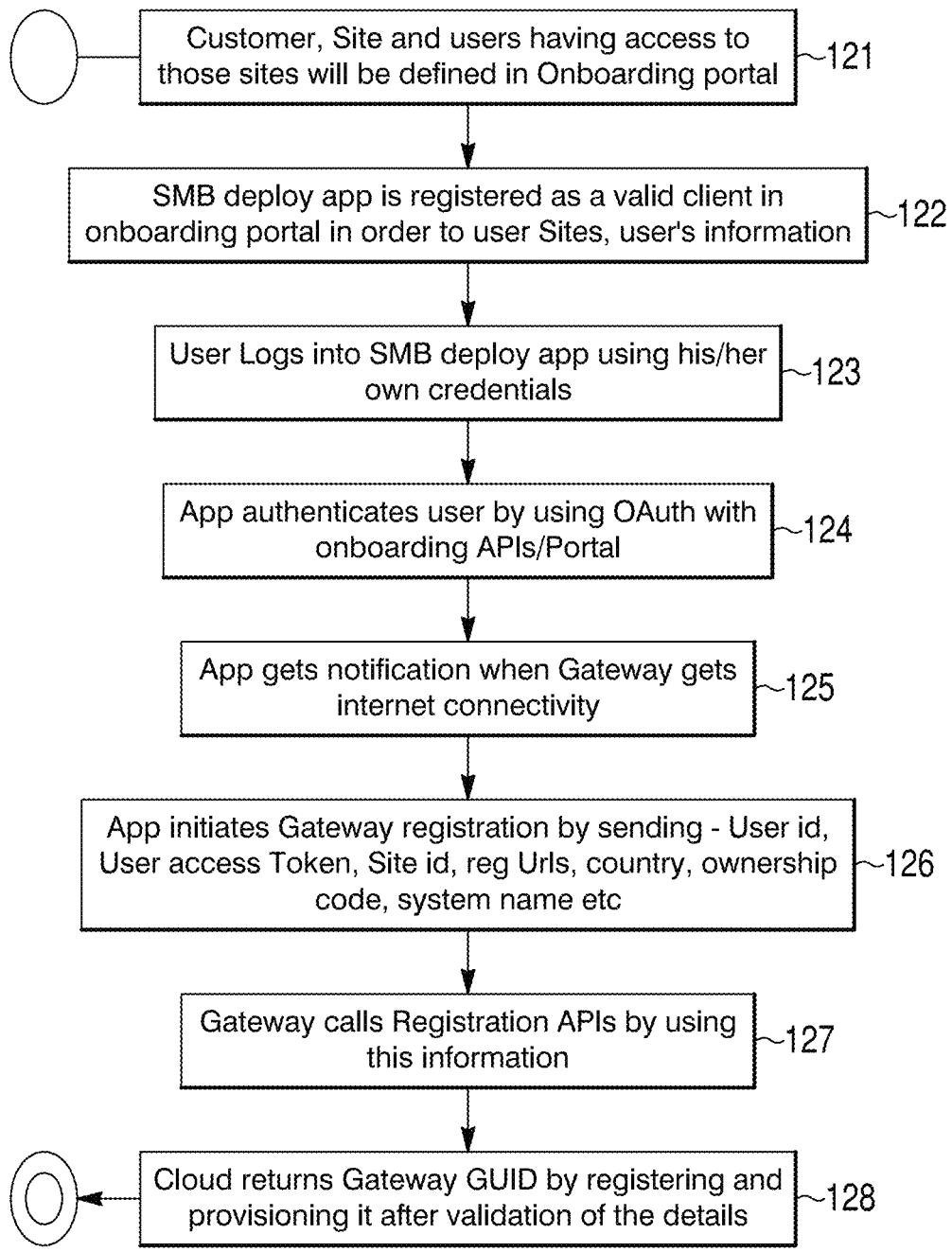
FIG. 8 is a diagram of a process for registration for access to certain sites.

FIG. 8 is a diagram of a process registration for access to certain sites by, for instance, a customer, user, and so on. Step 121 indicates the customer site and user having access to the sites that may be defined in an onboarding portal. Step 122 may indicate an SMB deploy app that is registered as a valid client in an onboarding portal in order to user sites, user information, and so forth. Step 123 is where the user may log into the SMB deploy app using his or her own credentials. Step 124 is where an app authenticates the user by using open authorization (OAuth) with onboarding APIs or portal. Step 125 is where the app gets notification when the gateway gets internet connectivity. At step 126, the app may initiate gateway registration by sending a user ID, user access token, site ID, reg URLs, country, ownership code, system name, and so forth. At step 127, the gateway may call registration APIs by using this information. Step 128 is where the cloud returns a gateway GUID by registering and provisioning it after validation of the details.

Figure 9:
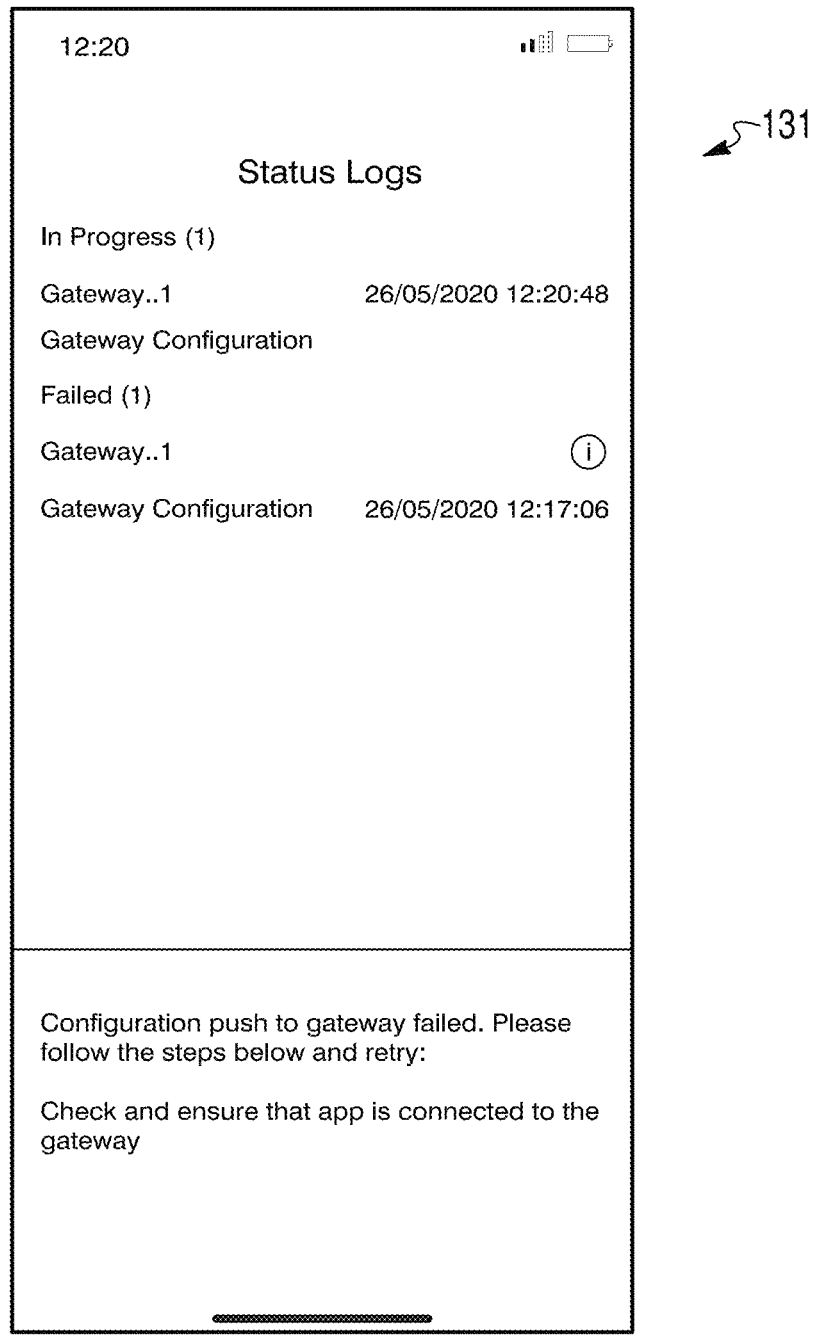
FIG. 9 is a diagram of an example of a status log.

FIG. 9 is a diagram of an example of a status log 131. A configuration push to a gateway may have failed. Indicated steps are set forth for retry. One may check and ensure that the app is connected to the gateway. Other steps leading to success may be provided.

One may note an intuitive and asynchronous device configuration download approach. In small and medium building (SMB) business, it appears important that entire installation, configuration and commissioning of control devices get completed fast.

The present system and approach may be about an intuitive way of automatically and asynchronously downloading the configuration to multiple control devices in single shot from a mobile app.

The present approach may help avoid any manual errors as entire process is automated. As entire process is asynchronous, user can continue to work on the site while download is in progress The present system may incorporate: 1) A gateway; 2) Devices/controllers; 3) A mobile app (SMB deploy) to configure the devices; and 4) A central database. The SMB deploy may be a mobile app used to configure control devices such as a thermostat, a smart IO which may control BMS equipment like RTU, VRF, AHU, lighting, and so on. The present configuration should be downloaded from the mobile app to a control device via the gateway. The mobile app may works as a client and the gateway act as a server. The gateway may expose multiple APIs categorized functionally which can be called by mobile app to send the configuration data. The gateway may provide APIs for downloading the device configuration from App. These APIs may be categorized based on the type of data such as Device details API, Point details API, Alarm details API, Application configuration API, Schedule configuration API, and so forth.

As and when the configuration is being done in mobile app, the mobile app may keep track of changes done in a local database. Whenever the mobile app is connected to the gateway over Wi-Fi, either using gateway's access point or using external router, the mobile app may log into a gateway webserver as a web client by providing a client certificate soon after the mobile app connects to the gateway. The mobile app may use a unique identifier of the device (UUID) that is entered in the mobile app for each device to identify and map the logical device with physical device.

Once the gateway authenticates the mobile app, the gateway may provide a session Id to the mobile app, which the mobile app can use for further communication. After a login, the mobile app may call the gateway web APIs for the configured data automatically in the background. The gateway may queue the incoming APIs and send a status code to the mobile app after validating the data. If data is valid, the gateway may send an error code indicating that the gateway has successfully accepted the request. In case the request has invalid data, the gateway may send an error code to the mobile app. Once mobile app successfully logs into a gateway's webserver, the mobile app may subscribe to a gateway's web socket so that the gateway can send asynchronous responses to the mobile app for the API requests.

The gateway may process requests and send an actual response of the API over a websocket to the mobile app. The mobile app may process the websocket response and update its local database with any configuration data that it would have received along with status. Also, while the requests are in progress, there may be a status log maintained in the mobile app. The user may see the status of various requests in the status log. Status log may show each API request details such as the device to which configuration is downloaded, the request initiated date and time, a response received date and time, and a current status such as InProgress, Failed, and Succeeded. If a request fails, the mobile app may retry the same request more or less three times, and declare the request as failed in status log. For any failed response, the mobile app may also show more information on possible reasons for failure, and also, giving an option right then and there to retry the request.

The mobile app may also categorize the device list view to show the devices for which a configuration is yet to be downloaded on the top, and the devices for which configuration is downloaded in the bottom. The mobile app may also show the last downloaded date and time for each of the devices. If the mobile app disconnects from Gateway's network, the mobile app may flag all requests as failed and may attempt to redownload soon after the mobile app is connected to the gateway over Wi-Fi.

One may note a seamless configuration data synchronization for a small and medium building management system. In building management system, there may be multiple applications targeting multiple personas, but working on the same job site. These applications may have their own local database to provide flexibility of data modification locally without needing to have internet connectivity. As each application may have its own local database, it appears important to synchronize the data from these applications and consolidate the data in a central database to maintain data integrity. Also, once installation and commissioning of a site is completed, the site manager/portfolio manager would like to see the site dashboard in a supervisor to get operational data like alarms, schedules, trends, and the like. The present approach may demand seamless data integration so that all the applications can always represent the updated data. There may be intuitive solutions through which seamless data synchronization is achieved with multiple applications.

The present approach may be about seamless data integration across multiple applications of an SMB system such that the latest data is readily available and represented in each application. A small and medium building (SMB) solution may consist of various applications through which a BMS site data gets modified for configuration and commissioning. These applications may involve an SMB deploy app, a supervisor, an onboarding portal, and a thermostat in built human machine interface (HMI).

The site configuration data may be stored in the central database which is accessed by these tools. Also, some of these tools may have local databases so that the configuration and commissioning can be done without needing to have internet connectivity.

Site configuration may start with the onboarding process where a system admin creates the site that needs to be setup. This process may create the site information in the central database that is stored in the cloud.

Then the system admin may assign the required users, i.e., a site engineer who needs to install the devices, e.g., a controller, thermostat and so forth, and to configure the different pieces of HVAC equipment that needs to be controlled by these devices like an air handling unit (AHU), roof top unit (RTU), and so on. The site engineer may get notified through an SMS/email to start the installation and configuration of a required site. The site engineer may use a mobile app (deploy app) to perform the installation, configuration and commissioning of the devices and equipment at the site. When the site engineer logs into the mobile app using the user specific credentials, the mobile app may display a list of sites for which the user has access. When the site engineer selects the required site that needs to be installed and configured, the system may internally lock the site for that user and update the central database so that other users are aware that the site is locked by the respective user and configuration of the site has been started. The user needs not to explicitly deal with the option to lock the site. In an SMB context, the site configuration may have to be completed within a predetermined amount of time; so this lock also has validity for a predetermined amount of time, after which it gets auto released.

There should be a sync service in the cloud that may be responsible for keeping the site configuration consistent and making it available across the tools like the SMB deploy app, the supervisor and the thermostat HMI. The mobile app may also download site information locally from a central database along with lock details so that user can continue with the configuration on the site even if there is no internet connectivity.

The system admin may also get the notification that work has been started that aids in tracking the progress of site configuration. The mobile app may keep track of changes done locally for every configuration that is being done through the mobile app since the last synchronized time.

There shall be an option which can be used by the site engineer to mark that site configuration is completed, which internally unlocks the site and updates this configuration from local database to the central database when the mobile app gets internet connectivity.

This lock info may be provided along with the configuration data changes to the sync service to update the data in the central database. The sync service may also keep the track of configuration entities created, updated or deleted in the central database. The sync service may retrieve the configuration entities from central database which are created, updated or deleted beyond the provided last synchronized time stamp to provide it to the mobile app.

Before pushing data from mobile app to central database, the mobile app first downloads any latest configuration from the central database and then pushes its data. At the end of this push, the lock may get released automatically. The mobile app may update its local database with the last sync time stamp. The user needs not to explicitly deal with the option to unlock the site. The system admin may also get the notification that the work has been completed. An operator may view this configuration from the supervisor portal to monitor the site.

If another engineer wants to continue working on same site in his mobile phone, then the sync service may check if there is no other user acquired lock for that site and only then allows the user on the site by locking the site to him. Also, the latest configuration may get downloaded from central database to the mobile app based on the last sync time stamp for that site.

In scenarios when the configuration parameters and schedules got modified in the thermostat HMI, there may be a configuration changed event raised to the cloud service using a Forge TOT mechanism through the gateway at the site. When the cloud service gets a configuration changed event, it may use the Forge TOT mechanism to read the configuration parameters and schedules, and update the site configuration in the central database.

The present system does not necessarily require any manual intervention to update this data from the thermostat HMI.

The mobile app may highlight those devices for which the configuration version in the local mobile app database is different from the configuration version of the online device. In this case, the mobile app may also read a configuration from the device and update it in the local database to maintain data consistency and display updated data.

Figure 10:
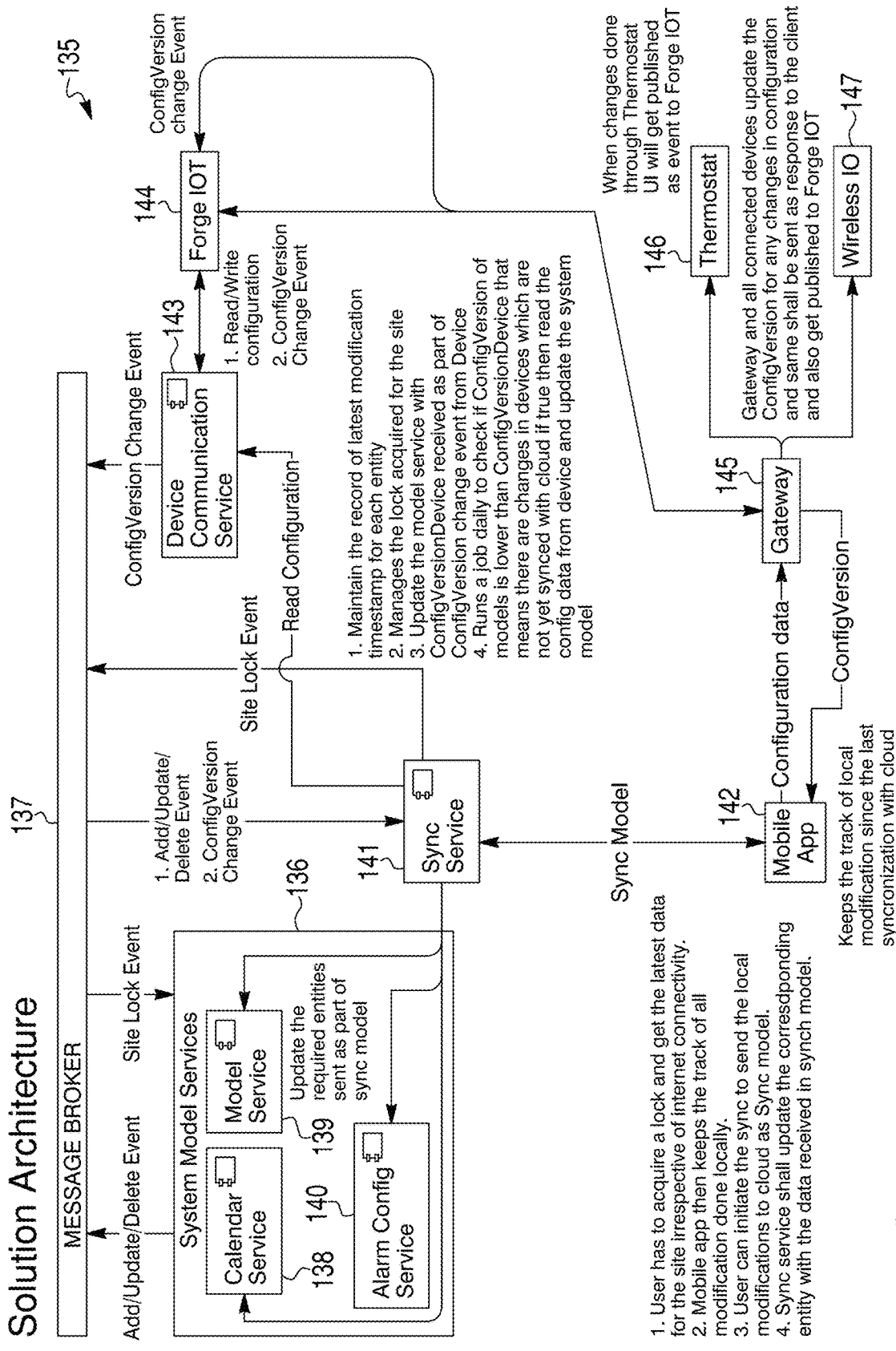
FIG. 10 is a diagram of a solution architecture.

FIG. 10 is a diagram of a solution architecture 135. A system model services block 136 may output an add/update/delete event signal to a message broker 137. System model services block 136 may have a calendar service block 138, a model service 139 and an alarm configuration service block 140. Blocks 138, 139 and 140 may receive a signal from a sync service 141. The signal may include an update of the required entities sent as a part of a sync model. Block 136 may receive a site lock event from broker 137.

Sync service 141 may receive an add/update/delete event and config version/change event signals from broker 137. Sync service 141 may send site lock event information to broker 137. Items that sync service block 141 is responsible for may include to maintain the record of the latest modification time stamp for each entity, manage the lock acquired for the site, update the model service with a config version device received as a part of config version change event from a device, run a job daily to check if config version of a model is lower than config version in the device that means there are changes in devices which are not yet synced with a cloud. If true, then there is a read of the config data from device and an update of the system model.

Sync service block 141 may receive sync model information from mobile app 142. An output of a read configuration from sync service 141 may go to a device communication service block 143. Block 143 may send config version change event information to broker 137. A Forge IOT 144 may send and/or receive a read/write configuration and config version change event.

It may be noted that mobile app 142 may keep track of a local modification since a last synchronization with a cloud. Mobile app 142 may send configuration data to a gateway 145. Gateway 145 may send config version information to mobile app 142. Gateway 145 may send and receive a configuration change through system command and a config version change event to and from Forge IOT 144.

Gateway 145 may send out information to a thermostat 146 and a wireless IO 147. The information may include when changes are done through a thermostat user interface, it may get published as an event to the Forge IOT. Gateway 145 and all connected devices may update the config version for any change in configuration, and the same shall be sent as a response to the client and also get published to Forge IOT.

In general, it may be noted that the user needs to acquire a lock and get the latest data for the site regardless of internet connectivity. The mobile app may then keep track of all modifications done locally. The user may initiate the sync to send the local modifications to a cloud as a sync model. The sync service should update a corresponding entity with data received in the sync model.

The present approach may have data that is seamlessly synchronized across multiple applications of the SMB system. These applications may include: 1) SMB deploy mobile app; 2) Supervisor; and 3) Thermostat HMI.

When a user logs into the mobile app for installation and commissioning, and selects a site, that site will be locked to that user in a central database so that no other users can work on that site until a lock is released. If another user tries to log into the mobile app or supervisor, and selects the same project, the other user may be notified of the user's details to whom the site has been locked due to which the user will not be able to configure or use the same project.

The mobile app may also download the site information locally from a central database along with lock details so that the user can continue with the configuration on the site even if there is no internet connectivity. As to and when the user configures site data using the mobile app, the mobile app may keep track of the changes that are being done locally.

Once the user completes the site configuration and marks the site as completed, the mobile app may automatically push the data to a central database whenever the mobile app is connected to an internet.

The mobile app may maintain a last synchronized time stamp for each site so that when user logs in next time, the mobile app uses this time stamp to get any delta changes done in the central database into the mobile app's local database.

Before pushing data from the mobile app to the central database, the mobile app may first download any latest configuration using the last sync time stamp and then push its local data to the central database. At the end of this push, the lock may get released automatically and the mobile app may update its local database with the last sync time stamp.

The sync service in the cloud may release the lock automatically after a predetermined time, if there is no sync that happened from the user's mobile app. If user forgets to mark a site as complete, the app may keep reminding one that the project has been in progress for long time and the data are not synchronized to the central database.

Once the site data is synchronized to the central database, the supervisor application may be readily able to fetch this information and provide dashboards with alarms, schedules and trend data of the site.

In scenarios when the configuration parameters and schedules get modified in a thermostat HMI, there may be a configuration changed event raised to the cloud service using a Forge IOT mechanism through the gateway at site. When the cloud service gets the configuration changed event, it may use the Forge IOT mechanism to read the configuration parameters and schedules, and update the site configuration in the central database.

The mobile app may highlight those devices for which a configuration version in the local mobile app database is different from the configuration version of the online device.

In this case, the mobile app may also read a configuration from the device and updates in the local database to maintain data consistency and display the updated data.

There are numerous advantages of the present system and approach. As the site data may be seamlessly synchronized and made available to the supervisor, there appears no additional steps required to setup the supervisor.

It may help to maintain data integrity so that the users can always see updated data in all the applications. The users may seamlessly modify the same site data in any application. Multiple users may work on same site one after the other by seeing the latest change done by other users on the same project. As the entire process is automated, it may save much time especially for small and medium building systems.

To recap, a terminal assignment and wiring diagram for a building management system (BMS), may incorporate a smart input output (IO) mechanism, and a thermostat controller. The thermostat controller may have a fixed number of input/output terminals for connection to field devices. The field devices may include input devices such as sensors and output devices such as actuators. The input and output devices may be configured in a small medium business (SMB) mobile app resulting in a configuration. The configuration may indicate to which terminal of a controller that each input device and output device should be wired.

When application parameters in a user interface of the mobile app for a given controller are configured for the configuration, the mobile app may automatically build a point list based on a selection of parameters of the configuration.

The automatically built point list may mimic color coding and terminal numbering of actual field devices.

The terminals may be reassigned by a drag and drop of a relevant I/O point to a terminal as desired or required.

Reassignment of terminals may start by pressing an I/O point name, the I/O point may then become unassigned and pushed to a point parking lot where it stays until the point is scrolled to a correct terminal, and then the point may be dragged and dropped from the parking lot. If the point is dropped on a wrong terminal, the point may return to the parking lot.

If the terminal desired or required is occupied, the points may get swapped, and then a selected point may get reassigned and a second point occupying the desired or required terminal may get pushed to the parking lot, and then the second point may be reassigned. If all terminals are occupied, then a swap of points may occur with the same point type.

Upon completion of assignment of points to terminals, a wiring diagram may be generated for reference in the field.

Upon a generation of the wiring diagram, it may be copied to a gallery of a mobile phone for reference.

The wiring diagram may be pinched and zoomed for an amplified view of a terminal.

Free terminals may be differentiated from connected terminals.

An SMB may have less than 500 employees and gross annual sales less than $100 million.

An approach for forming a wiring diagram for a building management system (BMS), may incorporate obtaining a smart input output (IO) mechanism, and obtaining a thermostat controller at least partially connectable to the smart input output (IO) mechanism. The thermostat controller may have a fixed number of input/output terminals for connection to field devices. The field devices may include input devices and output devices. The input and output devices may be arranged into a configuration. The configuration may indicate to which terminal of a controller that each input device and output device should be wired. The input devices may incorporate sensors. The output devices may incorporate actuators. When application parameters in a user interface of the mobile app for a given controller are configured for the configuration, the mobile app may automatically build a point list based on a selection of parameters in the configuration.

The automatically built point list may mimic color coding and terminal numbering of actual field devices. The terminals may be reassigned by a drag and drop of a relevant I/O point to a terminal as desired or required.

Reassignment of terminals may incorporate pressing an I/O point name. An I/O point may become unassigned and pushed to a point parking lot where it stays until the point is scrolled to a correct terminal, and then the point may be dragged and dropped from the parking lot. If the point is dropped on a wrong terminal, the point may return to the parking lot.

If the terminal desired or required is occupied, the points may get swapped, and the a selected point may get reassigned and a second point occupying the desired or required terminal may get pushed to the parking lot, and then the second point may be reassigned. If all terminals are occupied, then a swap of points may occur with the same point type.

An arrangement for wiring and terminals for a building management system (BMS) equipment, may incorporate a smart input output (IO) mechanism, and a thermostat controller. The thermostat controller may have a fixed number of input/output terminals for connection to field devices. The field devices may include input devices and output devices. The input and output devices may be arranged into a configuration. The configuration may indicate to which terminal of a controller that each input device and output device should be wired.

When application parameters in a user interface of the mobile app for a given controller are configured for the configuration, the mobile app may automatically build a point list based on a selection of parameters of the configuration.

Upon completion of assignment of points to terminals, a wiring diagram may be generated for reference in the field.

Upon a generation of the wiring diagram, it may be copied to a gallery of a mobile phone for reference.

Free terminals may be differentiated from connected terminals.

U.S. patent application Ser. No. 16/863,266, filed May 29, 2020, is hereby incorporated by reference.

Any publication or patent document noted herein may hereby be incorporated by reference to the same extent as if each individual publication or patent document was specifically and individually indicated to be incorporated by reference.

In the present specification, some of the matter may be of a hypothetical or prophetic nature although stated in another manner or tense.

Although the present system and/or approach has been described with respect to at least one illustrative example, many variations and modifications will become apparent to those skilled in the art upon reading the specification. It is therefore the intention that the appended claims be interpreted as broadly as possible in view of the related art to include all such variations and modifications.

What is claimed is:

1. A system, comprising:
a smart input output (IO) mechanism;
a thermostat controller;
wherein:
the thermostat controller has a fixed number of input/output terminals for connection to one or more field devices;
the one or more field devices are configured in a mobile app resulting in a configuration;
the configuration indicates to which terminal of the thermostat controller that each field device is to be wired; and
reassignment of terminals with the mobile app comprises pressing an I/O point name causing an I/O point associated with the I/O point name to become unassigned and pushed to a point parking lot and then subsequently dragging and dropping the I/O point from the parking lot to a desired terminal to assign the I/O point to the desired terminal, and when the I/O point is dropped on a wrong terminal, the I/O point is automatically returned to the point parking lot.

2. The system of claim 1, wherein when application parameters in a user interface of the mobile app for a given controller are configured for the configuration, the mobile app automatically builds a point list based on a selection of parameters of the configuration.

3. The system of claim 2, wherein the automatically built point list mimics color coding and terminal numbering of actual field devices.

4. The system of a claim 1, wherein:
if the desired terminal is occupied, dragging and dropping the I/O point from the parking lot to the desired terminal causes a second I/O point that is currently assigned to the desired terminal to become unassigned and pushed to the parking lot before the I/O point gets assigned to the desired terminal.

5. The system of claim 2, wherein upon completion of assignment of I/O points to terminals, a wiring diagram can be generated for reference in the field.

6. The system of claim 5, wherein upon a generation of the wiring diagram, it can be copied to a gallery of a mobile phone for reference.

7. The system of claim 6, wherein the wiring diagram can be pinched and zoomed for an amplified view of a terminal.

8. The system of claim 6, wherein free terminals are differentiated from connected terminals.

9. A method for forming a wiring diagram for a building management system (BMS), comprising:
obtaining a smart input output (IO) mechanism; and
obtaining a thermostat controller at least partially connectable to the smart input output (IO) mechanism; and
wherein:
the thermostat controller has a fixed number of input/output terminals for connection to field devices;
the field devices include input devices and output devices;
the input and output devices are arranged into a configuration;
the configuration indicates to which terminal of a controller that each input device and output device should be wired;
the input devices comprise sensors;
the output devices comprise actuators; and
when application parameters in a user interface of a mobile app for a given controller are configured for the configuration, the mobile app automatically builds a point list based on a selection of parameters of the configuration and
wherein reassignment of terminals comprises:
pressing an I/O point name cause an I/O point associated with the I/O name to become unassigned and pushed to a point parking lot;
dragging and dropping the I/O point from the parking lot to a desired terminal, wherein when the desired terminal is occupied, the I/O points get swapped, and the I/O point gets reassigned and a second I/O point currently occupying the desired terminal gets pushed to the parking lot, and then the second I/O point is reassigned.

10. The method of claim 9, wherein:
the automatically built point list mimics color coding and terminal numbering of actual field devices.

11. The method of claim 9, wherein:
the reassignment of terminals comprises scrolling to the desired terminal; and
if the I/O point is dropped on a wrong terminal, the point returns to the parking lot.

12. The method of a claim 9, wherein
if all terminal are occupied, then a swap of I/O points may occur with the same point type.

13. An arrangement system for a building management system (BMS) equipment, comprising:
a smart input output (IO) mechanism; and
a thermostat controller; and wherein:
the thermostat controller has a fixed number of input/output terminals for connection to field devices;
the field devices include input devices and output devices;
the input and output devices are arranged into a configuration;
the configuration indicates to which terminal of a controller that each input device and output device should be wired; and
the terminals can be reassigned by a drag and drop of a relevant I/O point to a terminal as desired or required and if the relevant I/O point is dropped on a wrong terminal, the I/O point returns to a parking lot for unassigned I/O points.

14. The arrangement system of claim 13, wherein when application parameters in a user interface of a mobile app for a given controller are configured for the configuration, the mobile app automatically builds a point list based on a selection of parameters of the configuration.

15. The arrangement system of claim 14, wherein upon completion of assignment of points to terminals, a wiring diagram can be generated for reference in the field.

16. The arrangement system of claim 15, wherein upon a generation of the wiring diagram, it can be copied to a gallery of a mobile phone for reference.

17. The arrangement system of claim 16, wherein free terminals are differentiated from connected terminals.

* * * * *